US010717936B2

(12) United States Patent
Stanislaus et al.

(10) Patent No.: US 10,717,936 B2
(45) Date of Patent: Jul. 21, 2020

(54) CATALYTIC PROCESS OF SIMULTANEOUS PYROLYSIS OF MIXED PLASTICS AND DECHLORINATION OF THE PYROLYSIS OIL

(71) Applicant: SABIC Global Technologies B.V., Bergen op Zoom (NL)

(72) Inventors: Alexander Stanislaus, Bangalore (IN); Ravichander Narayanaswamy, Bangalore (IN); Krishna Kumar Ramamurthy, Bangalore (IN); Santosh Ganji, Bangalore (IN); Abrar A. Hakeem, Elsloo (NL); Ashim Kumar Ghosh, Sugar Land, TX (US); Girish Koripelly, Bangalore (IN); Mohammad Javeed, Bangalore (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/318,464

(22) PCT Filed: Jul. 17, 2017

(86) PCT No.: PCT/IB2017/054315
§ 371 (c)(1),
(2) Date: Jan. 17, 2019

(87) PCT Pub. No.: WO2018/025104
PCT Pub. Date: Feb. 8, 2018

(65) Prior Publication Data

US 2019/0299491 A1 Oct. 3, 2019

Related U.S. Application Data

(60) Provisional application No. 62/369,360, filed on Aug. 1, 2016.

(51) Int. Cl.
*C10G 1/10* (2006.01)
*B01J 29/08* (2006.01)
(Continued)

(52) U.S. Cl.
CPC .............. *C10G 1/10* (2013.01); *B01J 29/084* (2013.01); *B01J 29/18* (2013.01); *B01J 29/40* (2013.01);
(Continued)

(58) Field of Classification Search
None
See application file for complete search history.

(56) References Cited

U.S. PATENT DOCUMENTS 5,173,175 A * 12/1992 Steffens .................. B01J 8/085 208/153
5,504,259 A 4/1996 Diebold et al. .............. 568/697
(Continued)

FOREIGN PATENT DOCUMENTS

CN 103980938 A 8/2014
EP 2895576 A1 3/2014
(Continued)

OTHER PUBLICATIONS

Hawkes "What is a 'Heavy Metal'?" Journal of Chemical Education vol. 74, No. 11 p. 1374 Nov. 1997 (Year: 1997).*
(Continued)

*Primary Examiner* — In Suk C Bullock
*Assistant Examiner* — Alyssa L Cepluch
(74) *Attorney, Agent, or Firm* — Norton Rose Fulbright US LLP

(57) ABSTRACT

A process for processing mixed plastics comprising simultaneous pyrolysis and dechlorination of the mixed plastics, the process comprising contacting the mixed plastics with a zeolitic catalyst in a pyrolysis unit to produce a hydrocarbon
(Continued)

product comprising a gas phase and a liquid phase; and separating the hydrocarbon product into a hydrocarbon gas stream and a hydrocarbon liquid stream, wherein the hydrocarbon gas stream comprises at least a portion of the gas phase of the hydrocarbon product, wherein the hydrocarbon liquid stream comprises at least a portion of the liquid phase of the hydrocarbon product, wherein the hydrocarbon liquid stream comprises one or more chloride compounds in an amount of less than about 100 ppmw chloride, based on the total weight of the hydrocarbon liquid stream, and wherein the hydrocarbon liquid stream is characterized by a viscosity of less than about 400 cP at a temperature of 300° C.

20 Claims, 12 Drawing Sheets

(51) Int. Cl.

| | |
|---|---|
| ***B01J 29/18*** | (2006.01) |
| ***B01J 29/40*** | (2006.01) |
| ***B01J 29/85*** | (2006.01) |
| ***B29B 17/04*** | (2006.01) |
| ***C10B 53/07*** | (2006.01) |
| ***C10G 11/18*** | (2006.01) |
| ***C10G 45/02*** | (2006.01) |
| ***C10G 69/06*** | (2006.01) |
| ***C10K 1/00*** | (2006.01) |
| ***C10G 45/58*** | (2006.01) |
| ***C10G 1/08*** | (2006.01) |
| ***C10G 1/00*** | (2006.01) |
| ***C10K 1/32*** | (2006.01) |
| ***C10B 57/06*** | (2006.01) |
| ***C10G 47/00*** | (2006.01) |
| *B29K 27/00* | (2006.01) |

(52) U.S. Cl.

CPC ............... *B01J 29/85* (2013.01); *B29B 17/04* (2013.01); *C10B 53/07* (2013.01); *C10B 57/06* (2013.01); *C10G 1/002* (2013.01); *C10G 1/086* (2013.01); *C10G 11/18* (2013.01); *C10G 45/02* (2013.01); *C10G 45/58* (2013.01); *C10G 47/00* (2013.01); *C10G 69/06* (2013.01); *C10K 1/003* (2013.01); *C10K 1/32* (2013.01); *B29B 2017/0496* (2013.01); *B29K 2027/00* (2013.01); *Y02P 20/143* (2015.11)

(56) References Cited

U.S. PATENT DOCUMENTS

| | | | | |
|---|---|---|---|---|
| 5,744,668 | A | 4/1998 | Zhou et al. | 585/241 |
| 5,841,011 | A | 11/1998 | Hashimoto et al. | 585/241 |
| 5,849,964 | A * | 12/1998 | Holighaus | C10G 1/002 585/241 |
| 6,172,271 | B1 | 1/2001 | Horizoe et al. | 585/241 |
| 6,436,168 | B1 | 8/2002 | Uematsu et al. | 75/471 |
| 6,649,044 | B1 | 11/2003 | Bolsing et al. | 208/262.1 |
| 7,048,862 | B2 | 5/2006 | Fukui et al. | 210/748 |
| 7,070,624 | B2 | 7/2006 | Holmes, III et al. | 8/130 |
| 8,350,104 | B2 | 1/2013 | Fujimoto et al. | 585/241 |
| 8,586,812 | B2 | 11/2013 | Timken et al. | 585/511 |
| 8,795,515 | B2 | 8/2014 | Zhan et al. | 208/262.1 |
| 2003/0047437 | A1 * | 3/2003 | Stankevitch | C10B 49/16 201/25 |
| 2004/0036018 | A1 | 2/2004 | Deguchi et al. | 250/281 |
| 2005/0075521 | A1 | 4/2005 | Wada | 585/241 |
| 2007/0173673 | A1 | 7/2007 | Fujimoto et al. | 585/241 |
| 2008/0190865 | A1 | 8/2008 | Zhao et al. | 210/757 |
| 2009/0054713 | A1 | 2/2009 | Matkovsky et al. | 585/326 |
| 2011/0166397 | A1 | 7/2011 | Fujimoto et al. | 585/241 |
| 2012/0108862 | A1 | 5/2012 | Elomari et al. | 585/17 |
| 2012/0165586 | A1 | 6/2012 | Timken et al. | 585/330 |
| 2012/0215043 | A1 * | 8/2012 | Gaffney | B01J 23/70 585/241 |
| 2012/0325724 | A1 | 12/2012 | Driver et al. | 208/262.1 |
| 2013/0237620 | A1 | 9/2013 | Fan et al. | 521/46.5 |
| 2014/0228606 | A1 * | 8/2014 | Narayanaswamy | C10G 1/10 585/241 |
| 2014/0311971 | A1 | 10/2014 | Scalzi et al. | 210/610 |

FOREIGN PATENT DOCUMENTS

| | | | |
|---|---|---|---|
| JP | H1015352 | A | 1/1998 |
| JP | 3297322 | B2 | 7/2002 |
| KR | 100989747 | B1 | 10/2010 |
| WO | WO2008150094 | A3 | 12/2008 |

OTHER PUBLICATIONS

U.S. Appl. No. 62/369,379, filed Aug. 1, 2016.

International Search Report and Written Opinion from PCT/IB2017/054315, Oct. 16, 2017, 10 pages.

*Cracking* (*chemistry*), Dec. 2015. In *Wikipedia*. Retrieved Mar. 9, 2020, https://web.archive.org/web/20151220220638/https://en.wikipedia.org/wiki/Steam_cracking.

* cited by examiner

Table 4: Plastic Model Feed Composition

| Feed Component | With PET (wt. %) | Without PET (wt. %) |
| --- | --- | --- |
| LLDPE | 18 | 19 |
| LDPE | 20 | 22 |
| HDPE | 19 | 20 |
| PP | 23 | 25 |
| PET | 7 | |
| PS | 11 | 12 |
| PVC | 2 | 2 |
| TOTAL MIXTURE (g) | 100 | 100 |

*FIG. 4A*

Table 5: RBF Run Conditions

| | RBF RUN #1 | RBF RUN #2 | RBF RUN #3 | RBF RUN #4 | RBF RUN #5 | RBF RUN #6 |
| --- | --- | --- | --- | --- | --- | --- |
| Feed (g) | 100 | 100 | 100 | 100 | 100 | 100 |
| ZSM-5 CAT-1 (g) | 5 | | | | | 4 |
| 10% Mg Loaded ZSM-5 CAT-1 (g) | | 5 | 5 | 5 | 5 | 1 |
| Cracking Temperature (°C) | 360 | 360 | 300 | 330 | 340 | 360 |
| Hold Time (min) | 20 | 20 | 20 | 20 | 20 | 20 |
| PET | Yes | Yes | Yes | Yes | No | Yes |
| $N_2$ Purge | Constant | Constant | Constant | Constant | Constant | Constant |
| Mass Closure (%) | 94.52 | 92.63 | 97.32 | 95.48 | 89.82 | 89.23 |
| Volatiles (%) | 5.48 | 7.37 | 2.68 | 4.52 | 10.18 | 10.77 |

*FIG. 4B*

Table 6: Total Chloride Analysis of RBF Runs 1 to 4

| Sample | Catalyst | Quantity of catalyst with respect to the feed | Temperature (°C) | ppm Chloride Measurement number | | Wash recovered | ppm Chloride Measurement number | |
|---|---|---|---|---|---|---|---|---|
| | | | | #1 | #2 | | #1 | #2 |
| RBF Run #1 | ZSM-5 CAT-1 | 5% | 360 | 1 | 1 | RBFW1a | 24 | 23 |
| | | | | | | RBFW1b | 5 | 4 |
| | | | | | | RBFW1c | 6 | 6 |
| RBF Run #2 | Mg-ZSM-5 CAT-1 | 5% | 360 | 1 | 1 | RBFW2a | 80 | 109 |
| | | | | | | RBFW2b | 29 | 28 |
| | | | | | | RBFW2c | 599 | 594 |
| RBF Run #3 | Mg-ZSM-5 CAT-1 | 5% | 300 | 67 | 85 | RBFW3a | 1 | 1 |
| | | | | | | RBFW3b | 45 | 49 |
| | | | | | | RBFW3c | 94 | 94 |
| RBF Run #4 | Mg-ZSM-5 CAT-1 | 5% | 330 | 151 | 129 | RBFW4a | 3 | 3 |
| | | | | | | RBFW4b | 37 | 42 |
| | | | | | | RBFW4c | 103 | 102 |
| RBF Run #5 (without PET) | Mg-ZSM-5 CAT-1 | 5% | 340 | 0.3 | 0.2 | | | |

*FIG. 4C*

Table 7

| | Hydro-pyrolysis 1 | Pyrolysis 1 | Hydro-pyrolysis 2 | Pyrolysis 2 | Hydro-pyrolysis 3 | Pyrolysis 3 |
|---|---|---|---|---|---|---|
| Feed Weight Transferred, g | 1.50 | 1.50 | 1.50 | 1.50 | 1.50 | 1.50 |
| Bone-Dry Catalyst Feed, g | 9.05 | 8.95 | 9.05 | 9.05 | 9.01 | 8.95 |
| C/F ratio, g/g | 6.03 | 6.0 | 6.03 | 6.03 | 6.00 | 6.0 |
| Reaction Start Temperature (°C) | 600 | 600 | 635 | 635 | 670 | 670 |
| 1 min Avg. Reactor Bed Temperature (°C) | 482 | 472 | 525 | 525 | 567 | 570 |
| Yield, wt. % based on $H_2$-free product | | | | | | |
| Methane | 0.92 | 0.40 | 1.00 | 0.56 | 3.20 | 0.99 |
| Ethane | 0.87 | 0.43 | 0.73 | 0.52 | 0.69 | 0.74 |
| Ethylene | 6.17 | 3.68 | 6.50 | 5.07 | 6.36 | 5.78 |
| Carbon Dioxide | 1.29 | 1.63 | 1.54 | 1.93 | 1.85 | 1.91 |
| Propane | 3.90 | 4.26 | 3.15 | 3.58 | 3.11 | 3.49 |
| Propylene | 12.76 | 11.05 | 13.63 | 12.93 | 14.67 | 14.75 |
| i-Butane | 4.56 | 4.99 | 3.85 | 4.75 | 3.77 | 3.53 |
| n-Butane | 2.67 | 1.84 | 2.07 | 1.57 | 1.31 | 1.41 |
| t-2-Butene | 3.16 | 2.67 | 3.10 | 2.89 | 2.99 | 3.01 |
| 1-Butene | 1.75 | 1.63 | 1.79 | 1.79 | 1.90 | 2.01 |
| i-Butylene | 4.68 | 4.55 | 4.56 | 4.76 | 4.72 | 4.97 |
| c-2-Butene | 2.22 | 1.92 | 2.19 | 2.09 | 2.14 | 2.21 |
| Carbon Monoxide | 1.25 | 0.10 | 0.35 | 0.00 | 0.80 | 0.25 |
| Gasoline | 43.83 | 45.34 | 41.66 | 42.42 | 42.11 | 49.30 |
| Diesel | 5.75 | 9.14 | 7.55 | 8.37 | 4.73 | 5.16 |
| Heavies | 0.56 | 1.64 | 0.78 | 0.88 | 0.49 | 0.86 |
| Coke | 4.67 | 4.73 | 5.55 | 5.88 | 5.12 | 5.64 |

*FIG. 6A*

Table 8

| | Hydro-pyrolysis 1 | Pyrolysis 1 | Hydro-pyrolysis 2 | Pyrolysis 2 | Hydro-pyrolysis 3 | Pyrolysis 3 |
|---|---|---|---|---|---|---|
| $C_1$-$C_4$ Yield, wt. % | 45.2 | 39.1 | 44.5 | 42.5 | 47.5 | 45.0 |
| Liquid Yield, wt. % | 50.1 | 56.1 | 50.0 | 51.7 | 47.3 | 49.3 |
| Coke Yield, wt. % | 4.7 | 4.7 | 5.6 | 5.9 | 5.1 | 5.6 |

*FIG. 6B*

Table 9

| | Hydro-pyrolysis 1 | Pyrolysis 1 | Hydro-pyrolysis 2 | Pyrolysis 2 | Hydro-pyrolysis 3 | Pyrolysis 3 |
|---|---|---|---|---|---|---|
| Total Aromatics Yield Boiling Below 240 °C, wt. % | 34.42 | 31.39 | 32.81 | 31.83 | 35.09 | 32.35 |
| $C_6$-$C_8$ Aromatics Yield, wt. % | 23.81 | 23.20 | 24.44 | 22.63 | 26.33 | 22.87 |
| Total Aromatics/Coke, wt. ratio | 6.9 | 6.6 | 5.9 | 5.4 | 6.9 | 5.7 |
| ($C_6$-$C_8$ Aromatics)/Coke, wt. ratio | 5.1 | 4.9 | 4.4 | 3.9 | 5.1 | 4.1 |
| Light gas olefins/Coke, wt. ratio | 6.6 | 5.4 | 5.7 | 5.0 | 6.4 | 5.8 |

*FIG. 6C*

Table 10

| | Hydro-pyrolysis 1 | Pyrolysis 1 | Hydro-pyrolysis 2 | Pyrolysis 2 | Hydro-pyrolysis 3 | Pyrolysis 3 |
|---|---|---|---|---|---|---|
| $C_4$ Olefins, wt. % | 11.81 | 10.76 | 11.64 | 11.54 | 11.77 | 12.20 |
| $C_3$ Olefins, wt. % | 12.76 | 11.05 | 13.63 | 12.93 | 14.67 | 14.75 |
| $C_2$ Olefins, wt. % | 6.17 | 3.68 | 6.50 | 5.07 | 6.36 | 5.78 |
| Total Olefins, wt. % | 30.74 | 25.49 | 31.77 | 29.54 | 32.80 | 32.72 |

*FIG. 6D*

Table 11

| | Hydro-pyrolysis 1 | Pyrolysis 1 | Hydro-pyrolysis 2 | Pyrolysis 2 | Hydro-pyrolysis 3 | Pyrolysis 3 |
|---|---|---|---|---|---|---|
| Hydrogen Transfer Index (HTI) | 0.87 | 1.00 | 0.67 | 0.77 | 0.56 | 0.57 |
| Isomerization Coefficient | 0.174 | 0.178 | 0.182 | 0.184 | 0.192 | 0.197 |
| $C_2$ Olefin / $C_2$ Saturated Hydrocarbon | 7.1 | 8.6 | 8.9 | 9.8 | 9.2 | 7.9 |
| $C_3$ Olefin / $C_3$ Saturated Hydrocarbon | 3.3 | 2.6 | 4.3 | 3.6 | 4.7 | 4.2 |
| $C_4$ Olefin / $C_4$ Saturated Hydrocarbon | 1.6 | 1.6 | 2.0 | 1.8 | 2.3 | 2.5 |
| % of i-$C_4$/ Total $C_4$ | 23.9 | 28.4 | 21.9 | 26.6 | 22.4 | 20.6 |
| % of Olefins / Total Gases | 68.0 | 65.1 | 71.5 | 69.6 | 69.0 | 72.6 |
| % Olefins / % Saturated Hydrocarbons | 2.6 | 2.2 | 3.2 | 2.8 | 3.7 | 3.6 |

*FIG. 6E*

Table 12 - DHA of liquid products below 240 °C

| | Hydro-pyrolysis 1 | Pyrolysis 1 | Hydro-pyrolysis 2 | Pyrolysis 2 | Hydro-pyrolysis 3 | Pyrolysis 3 |
|---|---|---|---|---|---|---|
| Paraffins, wt. % | 1.184 | 1.435 | 1.207 | 1.170 | 1.108 | 1.420 |
| i-Paraffins, wt. % | 10.161 | 12.389 | 9.598 | 12.120 | 8.545 | 13.330 |
| Olefins, wt. % | 2.944 | 9.159 | 2.555 | 4.858 | 0.976 | 3.900 |
| Naphthenes, wt. % | 3.727 | 5.390 | 3.135 | 3.867 | 2.329 | 4.030 |
| Aromatics, wt. % | 73.968 | 69.233 | 78.758 | 75.037 | 83.315 | 74.720 |
| BTX + EB* content in liquid boiling below 240 °C | 54.32 | 51.17 | 58.67 | 53.35 | 62.52 | 52.81 |

Note: *EB = ethyl benzene; BTX = benzene, toluene and xylenes.

*FIG. 6F*

CATALYTIC PROCESS OF SIMULTANEOUS PYROLYSIS OF MIXED PLASTICS AND DECHLORINATION OF THE PYROLYSIS OIL

This application is a national phase application under 35 U.S.C. § 371 of International Application No. PCT/IB2017/054315 filed Jul. 17, 2017, which claims priority to United States Provisional Patent Application No. 62/369,360 filed Aug. 1, 2016. The entire contents of each of the above-referenced disclosures is specifically incorporated by reference herein without disclaimer.

TECHNICAL FIELD

This disclosure relates to the production of hydrocarbon streams from mixed plastics via processes which include pyrolysis and dechlorination.

BACKGROUND

Waste plastics may contain polyvinylchloride (PVC) and/or polyvinylidene chloride (PVDC).

Through a pyrolysis process, waste plastics can be converted to gas and liquid products. These liquid products may contain paraffins, iso-paraffins, olefins, naphthenes, and aromatic components along with organic chlorides in concentrations of hundreds of ppm. However, the liquid products of a pyrolysis process (pyrolysis oils) might not be used as a feedstock for steam crackers due to feed requirements of very low concentrations of chlorine and limited olefin content. Thus, there is an ongoing need to develop methods for producing hydrocarbon feedstocks derived from waste plastics to meet certain steam cracker feed requirements.

BRIEF DESCRIPTION OF THE DRAWINGS

FIGS. 4A, 4B and 4C display data tables for Example 3;

FIGS. 6A, 6B, 6C, 6D, 6E and 6F display data tables for Example 4.

DETAILED DESCRIPTION

Disclosed herein are processes and systems for simultaneous pyrolysis and dechlorination of plastics, which include contacting the plastics with a zeolitic catalyst to yield a hydrocarbon liquid stream. The zeolitic catalyst may comprise medium pore zeolites and/or large pore zeolites with a silicon to aluminum ratio of from about 2.5 to about 1,000. The processes may include producing a treated hydrocarbon liquid stream from the hydrocarbon liquid stream, where the treated hydrocarbon liquid stream has a reduced viscosity when compared to a viscosity of the hydrocarbon liquid stream. The processes may further include feeding at least a portion of the treated hydrocarbon liquid stream to a steam cracker to produce a steam cracker product stream.

Other than in the operating examples or where otherwise indicated, all numbers or expressions referring to quantities of ingredients, reaction conditions, and the like, used in the specification and claims are to be understood as modified in all instances by the term “about.” Various numerical ranges are disclosed herein. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The endpoints of all ranges directed to the same component or property are inclusive of the endpoint and independently combinable. The term “X or more” means that the named component is present in an amount of the value X, and values which are more than X.

The terms “a,” “an,” and “the” do not denote a limitation of quantity, but rather denote the presence of at least one of the referenced item. As used herein the singular forms “a,” “an,” and “the” include plural referents.

As used herein, “combinations thereof” is inclusive of one or more of the recited elements, optionally together with a like element not recited, e.g., inclusive of a combination of one or more of the named components, optionally with one or more other components not specifically named that have essentially the same function. As used herein, the term “combination” is inclusive of blends, mixtures, alloys, reaction products, and the like.

Processes for simultaneous pyrolysis and dechlorination of mixed plastics (e.g., plastic waste) are described in more detail with reference to FIG. 1.

Figure 1:
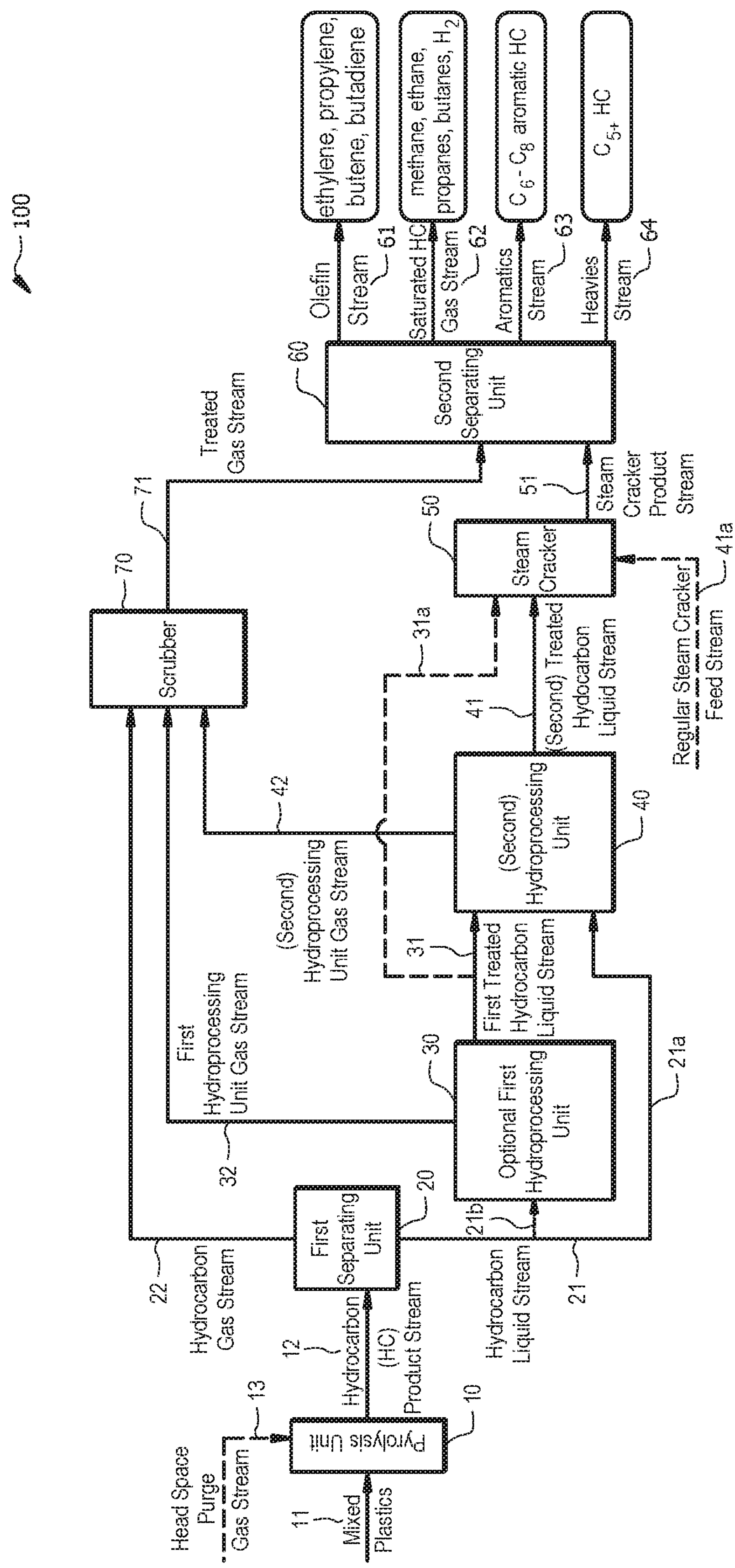
FIG. 1 displays a system for simultaneous dechlorination and pyrolysis of plastic waste.

FIG. 1 illustrates a pyrolysis and dechlorination system 100 which simultaneously pyrolizes plastics and dechlorinates chloride compounds, and may additionally hydrogenate olefins and further dechlorinate chloride compounds to provide for a feed that meets requirements for introduction to a steam cracker 50. The system 100 includes a pyrolysis unit 10, a first separating unit 20, an optional first hydroprocessing unit 30, a second hydroprocessing unit 40, a steam cracker 50, a second separating unit 60 and a scrubber 70.

A process for processing mixed plastics comprising simultaneous pyrolysis and dechlorination of the mixed plastics can comprise a step of contacting the mixed plastics with a zeolitic catalyst in a pyrolysis unit to produce a hydrocarbon (HC) product, wherein the hydrocarbon product comprises a gas phase and a liquid phase.

Mixed plastics (e.g., waste plastics) can be either placed in the pyrolysis unit 10 or fed to the pyrolysis unit 10 via mixed plastics stream 11. In the pyrolysis unit 10, the mixed plastics stream 11 is converted via pyrolysis and dechlorination reactions to a hydrocarbon product, wherein the hydrocarbon product comprises a gas phase (e.g., pyrolysis gases, such as $C_1$ to $C_4$ gases and hydrochloric acid (HCl) gas) and a liquid phase (e.g., pyrolysis liquid).

Mixed plastics which are loaded into or fed to the pyrolysis unit 10 via mixed plastics stream 11 may include post-consumer waste plastics, such as mixed plastic waste. Mixed plastics can comprise chlorinated plastics (e.g., chlorinated polyethylene), polyvinylchloride (PVC), polyvinylidene chloride (PVDC), non-chlorinated plastics (e.g., polyolefins, polyethylene, polypropylene, polyethylene terephthalate (PET), polybutylene terephthalate, polystyrene, copolymers, etc.), and the like, or mixtures thereof. In some aspects, the mixed plastics can comprise PVC, PVDC, polyethylene terephthalate, polybutylene terephthalate, polyolefins, polystyrenes, and the like, or combinations thereof. Generally, waste plastics comprise long chain molecules or polymer hydrocarbons. Waste plastics as disclosed herein also include used tires. The mixed plastics can comprise virgin mixed plastics and/or waste mixed plastics.

The mixed plastics stream 11 can comprise chloride in an amount of equal to or greater than about 10 ppmw, 50 ppmw, 100 ppmw, 200 ppmw, 300 ppmw, 400 ppmw, 500 ppmw, 600 ppmw, 700 ppmw, 800 ppmw, 900 ppmw, 600 ppmw, or 1,000 ppmw chloride, based on the total weight of the mixed plastics. The mixed plastics stream 11 can comprise PVC and/or PVDC in an amount of equal to or greater than about 400 ppmw, alternatively equal to or greater than about 700 ppmw, or alternatively equal to or greater than about 1,000 ppmw, based on the total weight of the mixed plastics.

The pyrolysis unit 10 may be any vessel configured to contain the zeolitic catalyst disclosed herein. The vessel may be configured for gas phase, liquid phase, vapor-liquid phase, or slurry phase operation. The pyrolysis unit 10 may include one or more beds of the zeolitic catalyst in fixed bed, fluidized bed, moving bed, ebullated bed, slurry bed, or combinations thereof. The pyrolysis unit 10 may be operated adiabatically, isothermally, nonadiabatically, non-isothermally, or combinations thereof. The pyrolysis reactions and the dechlorination reactions of this disclosure may be carried out in a single stage or in multiple stages. For example, the pyrolysis unit 10 can be two reactor vessels fluidly connected in series, each having one or more catalyst beds of the zeolitic catalyst.

The pyrolysis unit 10 may be one or more vessels configured to convert mixed plastics into gas phase and liquid phase products, while simultaneously dechlorinating the mixed plastics (e.g., reducing a chloride content of the mixed plastics). The one or more vessels may contain one or more beds of zeolitic catalyst, as well as of inert material, such as sand. Generally, the zeolitic catalyst and/or the inert material are capable of transferring heat to the components subject to the pyrolysis process in the pyrolysis unit 10, as well as promote the dechlorination of such components. In a configuration where the pyrolysis unit 10 comprises two vessels, the pyrolysis and dechlorination process may be divided into a first stage which is performed in the first vessel and in a second stage fluidly connected downstream of the first stage which is performed in the second vessel. As will be appreciated by one of skill in the art, and with the help of this disclosure, the second stage may enhance the pyrolysis and the dechlorination of an intermediate hydrocarbon product stream flowing from the first stage into the second stage, to yield a hydrocarbon product stream 12 flowing from the second stage.

In some configurations, the pyrolysis unit 10 may include one or more equipment configured to convert mixed plastics into gas phase and liquid phase products. The one or more equipment may or may not contain an inert material as described above. Examples of such equipment include one or more of heated rotating kiln, heated tank-type reactors, empty heated vessels, vessels surrounded by ovens or furnaces, fixed beds, fluidized beds, ebullated beds, extruders, devolatilization extruders, or any other suitable equipment offering a heated surface to assist in cracking.

In one or more configurations of the pyrolysis unit 10, a head space purge gas stream 13 is utilized in all or a portion of the pyrolysis and dechlorination stage(s) (conversion of waste plastics to a liquid phase and/or gas phase products) to enhance cracking of plastics, produce valuable products, provide a feed for steam cracking, remove HCl gas, or combinations thereof. The head space purge gas stream 13 may include hydrogen ($H_2$), $C_1$ to $C_4$ hydrocarbon gases (e.g., alkanes, methane, ethane, propane, butane, isobutane), inert gases (e.g., nitrogen ($N_2$), argon, helium, steam), and the like, or combinations thereof. The head space purge gas stream 13 may be introduced to the pyrolysis unit 10 to aid in the removal of volatiles entrained in the melted mixed plastics present in the pyrolysis unit 10. Without wishing to be limited by theory, the head space purge gas assists in the dechlorination by allowing for the removal of chlorides prior to the chlorides having the opportunity to react (e.g., via recombinations reactions) and produce heavier chlorine-containing compounds that could not be easily removed by using the head space purge gas.

The pyrolysis unit 10 can be configured to pyrolyse (e.g., crack), dechlorinate, and in some aspects (e.g., where hydrogen is added to the pyrolysis unit 10), additionally hydrogenate components of the mixed plastics stream 11 fed to the pyrolysis unit 10. Examples of reactions which may occur in the pyrolysis unit 10 include, but are not limited to removal of heteroatoms from heteroatom-containing hydrocarbons (e.g., dechlorination), conversion of one or more aromatics to one or more cycloparaffins, isomerization of one or more normal paraffins to one or more i-paraffins, selective ring opening of one or more cycloparaffins to one or more i-paraffins, cracking of long chain length molecules to short chain length molecules, or combinations thereof. Cracking reactions of organic chlorides, as well as other compounds present in the pyrolysis unit 10 can be promoted by a zeolitic catalyst as will be described in more detail later herein.

A hydrogen ($H_2$) containing stream can be added to the pyrolysis unit 10 to enrich the pyrolysis unit environment with $H_2$, for example via a $H_2$ containing stream fed directly to the pyrolysis unit independently of the mixed plastics stream 11.

The pyrolysis unit 10 may facilitate any reaction of the components of the mixed plastics stream 11 in the presence of, or with, hydrogen. Reactions may occur such as the addition of hydrogen atoms to double bonds of unsaturated molecules (e.g., olefins, aromatic compounds), resulting in saturated molecules (e.g., paraffins, i-paraffins, naphthenes). Additionally or alternatively, reactions in the pyrolysis unit 10 may cause a rupture of a bond of an organic compound, with a subsequent reaction and/or replacement of a heteroatom with hydrogen.

The use of hydrogen in the pyrolysis unit 10 can have beneficial effects of i) reducing the coke as a result of cracking, ii) keeping the zeolitic catalyst used in the process in an active condition, iii) improving removal of chloride from stream 11 such that the hydrocarbon product stream 12 from pyrolysis unit 10 is substantially dechlorinated with respect to mixed plastics stream 11, which minimizes the chloride removal requirement in units downstream of the pyrolysis unit 10, iv) hydrogenation of olefins, v) reducing diolefins in hydrocarbon product stream 12, vi) helping operate the pyrolysis unit 10 at reduced temperatures for same levels of conversion of mixed plastics stream 11 in the pyrolysis unit 10, or combinations of i)-vi).

The pyrolysis processes in the pyrolysis unit 10 may be low severity pyrolysis processes, which may occur at a pyrolysis temperature of 300° C. to 500° C., alternatively 325° C. to 475° C., or alternatively 350° C. to 450° C., and may produce pyrolysis products rich in mono- and di-olefins as well as a significant amount of aromatics, and may include chloride compounds in amounts which cause the hydrocarbon product stream 12 to have the chloride compound concentrations disclosed herein.

The pyrolysis unit 10 can be characterized by a pressure of equal to or greater than about 0.1 bar absolute (bara), alternatively equal to or greater than about 1 bar, or alternatively equal to or greater than about 10 bar. In some aspects, the pyrolysis unit 10 can be operated at a pressure above atmospheric pressure.

It is contemplated that dechlorination using the zeolitic catalyst as described herein is performed in the pyrolysis unit 10 without the use of chlorine sorbents, without addition of $Na_2CO_3$ in an effective amount to function as a dechlorinating agent, or both.

A zeolitic catalyst can be present in the pyrolysis unit 10 to promote cracking of organic chlorides. The zeolitic catalyst can further promote cracking of other compounds present in the pyrolysis unit 10, thereby lowering the viscosity of the fluid flowing from the pyrolysis unit 10, when compared to a viscosity of the melted mixed plastic. For purposes of the disclosure herein the term "zeolitic catalyst(s)" includes zeolites, zeolitic structures, zeolitic frameworks, aluminosilicates, aluminosilicates structures, aluminosilicates frameworks, zeolite-type materials, zeolite-type structures, zeolite-type frameworks, molecular sieves, silicoaluminophosphates, silicoaluminophosphates structures, silicoaluminophosphates frameworks, and the like, or combinations thereof.

In some aspects, zeolitic catalysts can comprise one or more aluminosilicate zeolites containing $SiO_4$ and $AlO_4$ tetrahedra in the structure. In other aspects, the zeolitic catalyst can comprise a zeolite-type material, such as silicoaluminophosphates (SAPOs) containing $PO_4$, $AlO_4$ and $SiO_4$ tetrahedra in the structure. Without wishing to be limited by theory, in the zeolite framework structure or zeolite-type framework structure, Si or Al or P can be partially substituted by other tri-valent or tetra-valent elements, such as Ge, Ga, B, etc. The $SiO_4$ and $AlO_4$ or $PO_4$ tetrahedra share oxygen atoms, wherein the framework structures have well defined channels and cavities (e.g., pores). These cavities may generally contain exchangeable cations, such as $Na^+$ and $K^+$.

Structural elements in zeolite can be partially substituted by one or more elements (e.g., tri-valent or tetra-valent elements, such as Ga, Ge, B, etc.), other than the exchangeable cations present in the zeolites. Each element of the one or more elements can be selected from the group consisting of titanium, nickel, copper, magnesium, tin, cobalt, iron, zinc, tungsten, vanadium, gallium, calcium, manganese, ruthenium and rhenium.

The zeolitic catalyst can comprise medium pore zeolites, large pore zeolites, or combinations thereof. Zeolites are inorganic crystalline solids having three-dimensional framework structure with channels and cavities with characteristic pore geometry. Zeolites can be classified according to their pore openings. For example, medium pore zeolites have 10 membered ring pore openings, which can be characterized by a pore size (e.g., diameter of the pore opening) of from 4.5 Å to 6.0 Å; and large pore zeolites have 12 membered ring pore openings, which can be characterized by a pore size (e.g., diameter of the pore opening) of from 6.0 Å to 8.0 Å. In some aspects, the zeolitic catalysts can comprise medium pore SAPOs, large pore SAPOs, or combinations thereof. SAPOs are both microporous and crystalline and have a three-dimensional crystal framework of $PO_4$, $AlO_4$ and $SiO_4$ tetrahedra.

Zeolitic catalysts suitable for use in the pyrolysis unit 10 can be acidic zeolites. Generally, acidic zeolites may contain Brönsted acid sites and Lewis acid sites. In zeolites, Brönsted acidic proton consist of a hydrogen atom bonded to the oxygen atom that connects the tetrahedrally coordinated aluminum which form the zeolite framework. The Lewis acid centers in zeolites contain tri-coordinated aluminum (Al) sites, which are electron deficient sites exhibiting the ability to accept electrons during interactions with molecules. Zeolites can be characterized by silicon to aluminum (Si/Al) ratios, which may vary from 1 to infinity, wherein the number of acid sites within a zeolite decreases with an increase in the Si/Al ratio. Some SAPOs can be characterized by Si/Al ratios of less than 1. Without wishing to be limited by theory, for zeolitic catalysts other than SAPOs, the acidity tends to increase in strength with increasing Si/Al ratio, and as the Si/Al ratio increases, the cation concentration and ion exchange capacity (proportional to the aluminum content) decreases. As will be appreciated by one of skill in the art, and with the help of this disclosure, structurally, SAPOs are similar to aluminosilicate zeolites, but acidic properties of SAPOs are different than the acidic properties of aluminosilicate zeolites. Further, without wishing to be limited by theory, insertion of Si in SAPO framework structure generates a negative charge on Al, thereby creating an acid site, and thus the number of acid sites is dependent on the amount of Si in SAPO. Thereby a SAPO should have a higher Si/Al ratio in order for the SAPO to have an increased number of acidic sites.

Zeolitic catalysts suitable for use in the pyrolysis unit 10 can be characterized by a Si/Al ratio of from about 0.01 to about 1,000, alternatively from about 0.05 to about 1,000, alternatively from about 0.1 to about 1,000, alternatively from about 0.5 to about 1,000, alternatively from about 1 to about 1,000, alternatively from about 2.5 to about 1,000, alternatively from about 10 to about 750, alternatively from about 25 to about 500.

The zeolitic catalyst can comprise a zeolite structure comprising ZSM-5, ZSM-11, Y, high-silica Y, USY, EU-1, EU-2, beta, mordenite, L, ferrierite, SBA-15, SAPO-5, SAPO-11, SAPO-31, SAPO-37, SAPO-41, and the like, or combinations thereof.

Zeolitic catalysts suitable for use in the pyrolysis unit 10 can be characterized by an average particle size of less than 1,000 microns, alternatively less than 750 microns, alternatively less than 500 microns, alternatively less than 100 microns, alternatively less than 50 microns, alternatively less than 10 microns, alternatively less than 5 microns, or alternatively less than 1 micron.

Zeolitic catalysts can be present in the pyrolysis unit 10 in an amount of equal to or greater than about 1 wt. %, alternatively equal to or greater than about 2 wt. %, alternatively from about 2 wt. % to about 50 wt. %, alternatively from about 5 wt. % to about 45 wt. %, or alternatively from about 10 wt. % to about 40 wt. %, based on the total weight of the mixed plastics and the zeolitic catalyst. In configurations where the pyrolysis unit 10 is a fluidized bed or ebullated bed, a zeolitic catalyst to mixed plastics stream 11 weight ratio of equal to or greater than about 1, alternatively equal to or greater than about 3, or alternatively equal to or greater than about 6, can be employed.

A hydrocarbon product stream 12 can be recovered as an effluent from the pyrolysis unit 10 and conveyed (e.g., flowed) to the first separating unit 20.

A process for processing mixed plastics comprising simultaneous pyrolysis and dechlorination of the mixed plastics can comprise separating the hydrocarbon product stream 12 in the first separating unit 20 into a hydrocarbon gas stream 22 and a hydrocarbon liquid stream 21, wherein the hydrocarbon gas stream 22 comprises at least a portion of the gas phase of the hydrocarbon product stream 12, and wherein the hydrocarbon liquid stream 21 comprises at least a portion of the liquid phase of the hydrocarbon product stream 12. The first separating unit 20 may comprise any suitable gas-liquid separator, such as a vapor-liquid separator, oil-gas separators, gas-liquid separators, degassers, deliqulizers, scrubbers, traps, flash drums, compressor suction drums, gravity separators, centrifugal separators, filter vane separators, mist eliminator pads, liquid-gas coalescers, and the like, or combinations thereof.

In some configurations, the first separating unit 20 can be a condenser which operates at conditions which condense a portion of the hydrocarbon product stream 12 into hydrocarbon liquids (e.g., liquid product) while leaving the hydrocarbon gases in the gas phase (e.g., gas product). A liquid product flows from the first separating unit 20 in hydrocarbon liquid stream 21, and a gas product flows from the first separating unit 20 in hydrocarbon gas stream 22.

The hydrocarbon gas stream 22 can comprise $C_1$ to $C_4$ hydrocarbons, $H_2$, inert gases (e.g., nitrogen ($N_2$), argon, helium, steam), HCl, and the like, or combinations thereof. The hydrocarbon gas stream 22 can comprise at least a portion of the chloride of the mixed plastics stream 11. In some aspects, hydrocarbon gas stream 22 can comprise equal to or greater than about 90 wt. %, 93 wt. %, 95 wt. %, or 99 wt. % of the total chloride the mixed plastics stream 11, based on the total weight of the chloride in the mixed plastics stream 11.

The hydrocarbon gas stream 22 can be further introduced to the scrubber 70, as will be described in more detail later herein.

A hydrocarbon liquid stream 21 can be recovered from the first separating unit 20. The hydrocarbon liquid stream can be a hydrocarbon melt stream or a hydrocarbon oil stream. For purposes of the disclosure herein, the hydrocarbon liquid stream can be referred to as a "hydrocarbon melt stream" when the viscosity of the hydrocarbon liquid stream is very high, such as greater than about 10,000 cP at 300° C. Further, for purposes of the disclosure herein, the hydrocarbon liquid stream can be referred to as a "hydrocarbon oil stream" when the viscosity of the hydrocarbon liquid stream is lower, such as less than about 10,000 cP at 300° C. The mixed plastics can be characterized by a melt viscosity of equal to or greater than about 50,000 cP, 60,000 cP, 70,000 cP, 80,000 cP, 90,000 cP, or 100,000 cP, at a temperature of 300° C. As will be appreciated by one of skill in the art, and with the help of this disclosure, a hydrocarbon oil stream is produced when the cracking reactions in the pyrolysis unit 10 are efficient (e.g., when there is a high degree of conversion of the mixed plastics into shorter chain hydrocarbons). Further, as will be appreciated by one of skill in the art, and with the help of this disclosure, a hydrocarbon melt stream is produced when cracking of the mixed plastics is very low (e.g., when there is a low degree of conversion of the mixed plastics into shorter chain hydrocarbons. Without wishing to be limited by theory, the degree of cracking is determined by the catalyst used, the catalyst concentration relative to feed or catalyst/feed ratio, the temperature employed, duration of cracking, or combinations thereof.

In some aspects, the hydrocarbon oil stream can be characterized by a viscosity of less than about 100 cP, alternatively less than about 75 cP, alternatively less than about 50 cP, alternatively less than about 40 cP, alternatively less than about 30 cP, alternatively less than about 25 cP, or alternatively less than about 20 cP, at a temperature of 300° C. A decrease in viscosity from the mixed plastics to the hydrocarbon liquid stream is due to pyrolysis (e.g., cracking) of the mixed plastics in the pyrolysis unit 10. Without wishing to be limited by theory, cracking reactions in the pyrolysis unit 10 can lead to smaller size molecules in the hydrocarbon oil stream when compared to the size of molecules in the mixed plastics, thereby leading to a decrease in viscosity. Without wishing to be limited by theory, the liquid state of the hydrocarbon oil stream is due to cracking of long polymeric chains of the mixed plastics to short chain hydrocarbons.

In some aspects, the liquid hydrocarbon stream can be characterized by a viscosity of less than about 400 cP, alternatively less than about 300 cP, alternatively less than about 200 cP, alternatively less than about 100 cP, alternatively less than about 75 cP, alternatively less than about 50 cP, or alternatively less than about 20 cP, at a temperature of 300° C. As will be appreciated by one of skill in the art, and with the help of this disclosure, consecutive viscosity measurements on the same sample (e.g., liquid hydrocarbon stream sample) can produce consecutively decreasing viscosity values. For example, a first viscosity measurement can indicate a viscosity of about 400 cP, while a second measurement involving additional heating before the viscosity measurement can result in a viscosity of less than about 30 cP. Without wishing to be limited by theory, this viscosity reduction can be attributed to further cracking during the viscosity measurement, owing to the elevated temperature at which the viscosity measurements are conducted, e.g., 300° C.

The pyrolysis of the mixed plastics can be characterized by a conversion of equal to or greater than about 70%, 75%, 80%, or 85%. For purposes of the disclosure herein, the conversion of the mixed plastics is calculated based on the % of products having boiling points below 370° C., and includes coke yield. The conversion of the mixed plastics accounts for coke, as well as $H_2$, $C_1$-$C_4$ gases, and $C_{4+}$ components having boiling points of from about 35° C. to about 370° C.

The hydrocarbon liquid stream 21 can comprise paraffins, i-paraffins, olefins, naphthenes, aromatic compounds, organic chlorides, or combinations thereof. When the hydrocarbon liquid stream 21 comprises paraffins, i-paraffins, olefins, naphthenes, and aromatic compounds, the stream can be referred to as a PIONA stream; and when the hydrocarbon liquid stream 21 comprises paraffins, olefins, naphthenes, and aromatic compounds, the stream can be referred to as a PONA stream.

The hydrocarbon liquid stream 21 can comprise one or more chloride compounds (e.g., organic chlorides, such as aliphatic chlorine-containing hydrocarbons, aromatic chlorine-containing hydrocarbons, and other chlorine-containing hydrocarbons) in an amount of less than the chloride amount in the mixed plastics stream 11. The amount of chloride compounds in the hydrocarbon liquid stream 21 may be less than 100 ppmw, 50 ppmw, 25 ppmw, or 10 ppmw chloride (e.g., equivalent chlorides), based on the total weight of the hydrocarbon liquid stream 21. A decrease in one or more chloride compounds from the mixed plastics to the hydrocarbon liquid stream is due to dechlorination of the mixed plastics in the pyrolysis unit 10.

Examples of paraffins which may be present in the hydrocarbon liquid stream 21 include, but are not limited to, $C_1$ to $C_{22}$ n-paraffins and i-paraffins. The paraffins can be present in the hydrocarbon liquid stream 21 in an amount of less than 10 wt. % based on the total weight of the hydrocarbon stream 1. Alternatively, the paraffins can be present in the hydrocarbon liquid stream 21 in an amount of 10 wt. %, 20 wt. %, 30 wt. %, 40 wt. %, 50 wt. %, 60 wt. %, or more based on the total weight of the hydrocarbon liquid stream 21. While certain hydrocarbon liquid streams include paraffins of carbon numbers up to 22, the present disclosure is not limited to carbon number 22 as an upper end-point of the suitable range of paraffins, and the paraffins can include higher carbon numbers, e.g., 23, 24, 25, 26, 27, 28, 29, 30, 31, 32, 33, 34, 35, 36, 37, 38, 39, 40, and higher.

Examples of olefins which may be present in hydrocarbon liquid stream 21 include, but are not limited to, $C_2$ to $C_{10}$ olefins and combinations thereof. Where hydrogen is introduced to the pyrolysis unit 10, due to hydrogenation reactions in the pyrolysis unit 10, the olefins can be present in the hydrocarbon liquid stream 21 in an amount of less than 10 wt. %, based on the total weight of the hydrocarbon liquid stream 21. Alternatively, the olefins can be present in the hydrocarbon liquid stream 21 in an amount of 5 wt. %, 10 wt. %, 20 wt. %, 30 wt. %, 40 wt. %, or more based on the total weight of the hydrocarbon liquid stream 21. While certain hydrocarbon streams include olefins of carbon numbers up to 10, the present disclosure is not limited to carbon number 10 as an upper end-point of the suitable range of olefins, and the olefins can include higher carbon numbers, e.g., 11, 12, 13, 14, 15, 16, 17, 18, 19, 20, 21, 22, 23, 24, 25, 26, 27, 28, 29, 30, and higher.

In some aspects, the hydrocarbon liquid stream 21 comprises no olefins, e.g., the hydrocarbon liquid stream 21 is substantially free of olefins.

Examples of naphthenes which may be present in the hydrocarbon liquid stream 21 include, but are not limited to, cyclopentane, cyclohexane, cycloheptane, and cyclooctane. The naphthenes can be present in the hydrocarbon liquid stream 21 in an amount of less than 10 wt. %, based on the total weight of the hydrocarbon liquid stream 21. Alternatively, the naphthenes can be present in the hydrocarbon liquid stream 21 in an amount of 10 wt. %, 20 wt. %, 30 wt. %, 40 wt. %, or more based on the total weight of the hydrocarbon liquid stream 21. While certain hydrocarbon streams include naphthenes of carbon numbers up to 8, the present disclosure is not limited to carbon number 8 as an upper end-point of the suitable range of naphthenes, and the naphthenes can include higher carbon numbers, e.g., 9, 10, 11, 12, 13, 14, 15, 16, 17, 18, 19, 20, 21, 22, 23, 24, 25, 26, 27, 28, 29, 30, and higher.

The hydrocarbon liquid stream 21 may comprise aromatic hydrocarbons with carbon numbers of 6, 7, 8, 9, 10, 11, 12, 13, 14, 15, 16, 17, 18, 19, 20, 21, 22, 23, 24, 25, 26, 27, 28, 29, 30, and higher. In an aspect, the aromatic hydrocarbons carbon number can be as high as 22. Nonlimiting examples of aromatic hydrocarbons suitable for use in the present disclosure as part of the hydrocarbon liquid stream 21 include benzene, toluene, xylenes, ethylbenzene, propylbenzenes, trimethylbenzenes, tetramethylbenzenes, dimethylnaphthalene, biphenyl, and the like, or combinations thereof. The aromatic hydrocarbons can be present in the hydrocarbon liquid stream 21 in an amount of 5 wt. %, 10 wt. %, 15 wt. %, 20 wt. %, 25 wt. %, 30 wt. %, 35 wt. %, 40 wt. %, 50 wt. %, 60 wt. %, 70 wt. %, 80 wt. % or more based on the total weight of the hydrocarbon liquid stream 21.

In some aspects, equal to or greater than about 10 wt. %, alternatively 25 wt. %, or alternatively 50 wt. % of the hydrocarbon liquid stream 21 is characterized by a boiling point of less than about 370° C.

In other aspects, equal to or greater than about 90 wt. %, alternatively 95 wt. %, or alternatively 99 wt. % of the hydrocarbon liquid stream 21 is characterized by a boiling point of less than about 350° C.

As shown in FIG. 1, at least a portion 21*b* of the hydrocarbon liquid stream 21 can be optionally conveyed to the first hydroprocessing unit 30 to produce a first treated hydrocarbon liquid stream 31 and a first hydroprocessing unit gas product stream 32. The first hydroprocessing unit 30 can be any suitable hydroprocessing reactor, such as a hydrocracker, a fluid catalytic cracker operated in hydropyrolysis mode, a thermal cracking reactor operated in hydropyrolysis mode, a hydrotreater, a hydrodealkylation unit, and the like, or combinations thereof. In some configurations, the hydroprocessing reactor can be a thermal pyrolysis reactor, a temperature controlled stirred tank batch reactor, a continuous rotary kiln, a twin screw extruder reactor, a circulating fluidized bed reactor similar to a fluid catalytic cracker, a bubbling fluidized bed reactor, and the like, or combinations thereof operated in a hydrogen environment. In some aspects, at least a portion 21*b* of the hydrocarbon liquid stream 21 can be sprayed as droplets into the first hydroprocessing unit 30, wherein the first hydroprocessing unit 30 can be a fluid catalytic cracker or thermal cracker operated in the hydropyrolysis mode at temperatures of from about 300° C. to about 450° C. (e.g., low severity mode), or alternatively at temperatures greater than about 450° C. (e.g., high severity mode), and wherein the droplets can be characterized by an average droplet size of less than about 500 microns, alternatively less than about 400 microns, or alternatively less than about 300 microns. Fluid catalytic crackers and thermal crackers operated in hydropyrolysis mode are described in more detail in U.S. Provisional Application No. 62/025,762 filed 17 Jul. 2014 and International Application No. PCT/IB2015/055295 filed 13 Jul. 2015. Generally, hydropyrolysis refers to a pyrolysis process conducted in the presence of hydrogen.

A hydrogen ($H_2$) containing stream can be added to the portion 21*b* of the hydrocarbon liquid stream 21 before entering the first hydroprocessing unit 30. Additionally or alternatively, a $H_2$ containing stream can be added to the first hydroprocessing unit 30 to enrich the first hydroprocessing unit environment with $H_2$, for example via a $H_2$ containing stream fed directly to the first hydroprocessing unit independently of the portion 21*b* of the hydrocarbon liquid stream 21.

The first hydroprocessing unit 30 can be characterized by a temperature of from about 250° C. to about 730° C., alternatively from about 300° C. to about 700° C., or alternatively from about 350° C. to about 650° C.

The first treated hydrocarbon liquid stream 31 can be characterized by a viscosity that is lower than the viscosity of the hydrocarbon liquid stream 21. A decrease in viscosity from the hydrocarbon liquid stream to the first treated hydrocarbon liquid stream is due to cracking of the hydrocarbon liquid stream in the first hydroprocessing unit 30.

In some aspects, equal to or greater than about 95 wt. %, alternatively 98 wt. %, or alternatively 99.5 wt. % of the first treated hydrocarbon liquid stream 31 is characterized by a boiling point of less than about 350° C.

The first treated hydrocarbon liquid stream 31 can be characterized by an olefin content that is lower than an olefin content of the hydrocarbon liquid stream 21. In some aspects, the first treated hydrocarbon liquid stream 31 can be characterized by an olefin content of less than about 1 wt. % olefins, based on the total weight of the first treated hydrocarbon liquid stream 31.

The first treated hydrocarbon liquid stream 31 can be characterized by an aromatics content that is less than or equal to an aromatics content of the hydrocarbon liquid stream 21. In some aspects, the first treated hydrocarbon liquid stream 31 can be characterized by an aromatics content of 80 wt. %, 70 wt. %, 60 wt. %, 50 wt. %, 40 wt.

%, 35 wt. %, 30 wt. %, 25 wt. %, 20 wt. %, 15 wt. %, 10 wt. %, 5 wt. % or less based on the total weight of the first treated hydrocarbon liquid stream 31.

The first treated hydrocarbon liquid stream 31 can comprise one or more chloride compounds in an amount of less than about 10 ppmw chloride, based on the total weight of the first treated hydrocarbon liquid stream 31.

As shown in FIG. 1, at least a portion 21*a* of the hydrocarbon liquid stream 21 and/or at least a portion of the first treated hydrocarbon liquid stream 31 can be conveyed to the second hydroprocessing unit 40 to produce a second treated hydrocarbon liquid stream 41 and a second hydroprocessing unit gas product stream 42. The second hydroprocessing unit 40 can be any suitable hydroprocessing reactor, such as a fixed bed type hydroprocessing reactor, an ebullated bed type hydroprocessing reactor, and/or a slurry type hydroprocessing reactor, which can be operated at hydrogen partial pressures and other suitable conditions that can saturate olefins and produce a second treated hydrocarbon liquid stream 41 which meets the feed requirements for the steam cracker 50. A fluid catalytic cracker and/or a thermal pyrolysis reactor operated in hydropyrolysis mode can also be used as the second hydroprocessing unit 40, provided that the fluid catalytic cracker and the thermal pyrolysis reactor are operated in such a way that olefins are saturated and the second treated hydrocarbon liquid stream 41 meets the feed requirements for the steam cracker 50.

A hydrogen ($H_2$) containing stream can be added to the portion 21*a* of the hydrocarbon liquid stream 21 and/or added to the at least a portion of the first treated hydrocarbon liquid stream 31 before entering the second hydroprocessing unit 40. Additionally or alternatively, a $H_2$ containing stream can be added to the second hydroprocessing unit 40 to enrich the second hydroprocessing unit environment with $H_2$, for example via a $H_2$ containing stream fed directly to the second hydroprocessing unit independently of the portion 21*a* of the hydrocarbon liquid stream 21 and/or added to the at least a portion of the first treated hydrocarbon liquid stream 31.

The second hydroprocessing unit 40 can be characterized by a temperature of from about 250° C. to about 730° C., alternatively from about 300° C. to about 650° C., or alternatively from about 350° C. to about 550° C. The second hydroprocessing unit 40 can be characterized by a pressure of from about 1 atm to about 200 barg.

In some configurations, the second hydroprocessing unit 40 can be a hydrodealkylation unit, hydrocracking unit, hydrotreating unit, or combinations thereof. The second hydroprocessing unit 40 can comprise a hydroprocessing catalyst comprising ZSM-5, ZSM-11, Y, high-silica Y, USY, EU-1, EU-2, beta, mordenite, L, ferrierite, SBA-15, SAPO-5, SAPO-11, SAPO-31, SAPO-37, SAPO-41, and the like, or combinations thereof; a metal loaded hydroprocessing catalyst, wherein the metal can comprise Ni, Mo, Co, Ni—Mo, Co—Mo, and the like, or combinations thereof. The second hydroprocessing unit 40 can comprise any hydroprocessing catalyst suitable to give a second hydroprocessing unit gas stream 42 and second treated hydrocarbon liquid stream 41.

The second treated hydrocarbon liquid stream 41 can be characterized by a viscosity that is lower than the viscosity of the hydrocarbon liquid stream 21 and/or a viscosity of the first treated hydrocarbon liquid stream 31. A decrease in viscosity from the hydrocarbon liquid stream and/or the first treated hydrocarbon liquid stream to the second treated hydrocarbon liquid stream is due to cracking of the hydrocarbon liquid stream 21 and/or the first treated hydrocarbon liquid stream 31, respectively in the second hydroprocessing unit 40.

The second treated hydrocarbon liquid stream 41 can be characterized by a boiling point that is lower than the boiling point of the hydrocarbon liquid stream 21 and/or a boiling point of the first treated hydrocarbon liquid stream 31. In some aspects, equal to or greater than about 97 wt. %, alternatively 98 wt. %, or alternatively 99.9 wt. % of the second treated hydrocarbon liquid stream 41 is characterized by a boiling point of less than about 370° C. In some aspects, equal to or greater than about 80 wt. %, 85 wt. % or 90 wt. % of the second treated hydrocarbon liquid stream 41 can be characterized by a boiling point of less than about 170° C. In some aspects, the second treated hydrocarbon liquid stream 41 comprises substantially $C_{10-}$ hydrocarbons.

The second treated hydrocarbon liquid stream 41 can be characterized by an olefin content that is lower than an olefin content of the hydrocarbon liquid stream 21 and/or an olefin content of the first treated hydrocarbon liquid stream 31. In some aspects, the second treated hydrocarbon liquid stream 41 can be characterized by an olefin content of less than about 1 wt. % olefins, based on the total weight of the second treated hydrocarbon liquid stream 41.

The second treated hydrocarbon liquid stream 41 can be characterized by an aromatics content that is less than or equal to an aromatics content of the hydrocarbon liquid stream 21 and/or an aromatics content of the first treated hydrocarbon liquid stream 31. In some aspects, the second treated hydrocarbon liquid stream 41 can be characterized by an aromatics content of equal to or greater than about 20 wt. %, 30 wt. %, 40 wt. %, 50 wt. %, 60 wt. %, or 70 wt. %, based on the total weight of the second treated hydrocarbon liquid stream 41.

The second treated hydrocarbon liquid stream 41 can comprise one or more chloride compounds in an amount of less than about 10 ppmw chloride, based on the total weight of the second treated hydrocarbon liquid stream 41.

As shown in FIG. 1, at least a portion 31*a* of the first treated hydrocarbon liquid stream 31 and/or at least a portion of the second treated hydrocarbon liquid stream 41 can be fed to the steam cracker 50, wherein the first treated hydrocarbon liquid stream 31 and/or the second treated hydrocarbon liquid stream 41, respectively meet steam cracker feed requirements for chloride content, olefin content, and boiling end point. Additionally or alternatively, all or a portion of the first treated hydrocarbon liquid stream 31*a* and the second treated hydrocarbon liquid stream 41 may be blended to produce a blended feed stream to the steam cracker 50, wherein the blended feed stream meets steam cracker feed requirements for chloride content, olefin content, and boiling end point. For example, a regular steam cracker feed stream 41*a* (e.g., naphtha, condensates which meet steam cracker feed requirements) can be blended with all or a portion of stream 41 and/or stream 31*a* to produce a combined feed to the steam cracker which meets feed requirements of the steam cracker. The proportion of stream 41*a* in relation to streams 41 and/or 31*a* can be increased such that the resulting combined feed meets the steam cracker feed requirements.

Steam cracker 50 generally has feed requirements (e.g., requires a dechlorinated feed with low olefin content) depending on operating constraints of individual steam crackers. First, the steam cracker 50 requires the amount of chloride compounds in the feed to the steam cracker 50 to be low. Second, the steam cracker 50 requires the amount of olefins in a stream fed to the steam cracker 50 to be low. The steam cracker 50 cracks molecules or cleaves at elevated temperatures carbon-carbon bonds of the components in the first treated hydrocarbon liquid stream 31 and/or the second treated hydrocarbon liquid stream 41 in the presence of steam to yield high value products.

A steam cracker product stream 51 comprising high value products can be recovered from the steam cracker 50 wherein the high value product comprises ethylene, propylene, butene, butadiene, aromatic compounds, and the like, or combinations thereof.

The steam cracker product stream 51 can be characterized by an olefin content that is greater than an olefin content of the first treated hydrocarbon liquid stream 31 and/or the second treated hydrocarbon liquid stream 41. In some aspects, the steam cracker product stream 51 can be characterized by an olefin content of equal to or greater than about 50 wt. % olefins, based on the total weight of the steam cracker product stream 51.

In some configurations of the pyrolysis and dechlorination system 100, at least a portion of the hydrocarbon gas stream 22, at least a portion of the first hydroprocessing unit gas product stream 32, at least a portion of the second hydroprocessing unit gas product stream 42, or combinations thereof can be introduced to a scrubber 70 to produce a treated gas stream 71, wherein a chloride content of the treated gas stream 71 is less than a chloride content of the hydrocarbon gas stream 22, the first hydroprocessing unit gas product stream 32, the second hydroprocessing unit gas product stream 42, or combinations thereof, respectively.

The scrubber 70 can contain a caustic solution (e.g., a solution of sodium hydroxide and/or potassium hydroxide in water) which can remove (e.g., via reaction, absorption, or combinations thereof) at least a portion of chloride (e.g., chlorine-containing gases) from the at least a portion of the hydrocarbon gas stream 22, at least a portion of the first hydroprocessing unit gas product stream 32, at least a portion of the second hydroprocessing unit gas product stream 42, or combinations thereof to yield a treated gas stream 71. At least a portion of the treated gas stream 71 can be further contacted with a chloride adsorber to remove any remaining chloride from the treated gas stream 71. Nonlimiting examples of chloride adsorbers suitable for use in the present disclosure include attapulgite, activated carbon, dolomite, bentonite, iron oxide, goethite, hematite, magnetite, alumina, gamma alumina, silica, aluminosilicates, ion exchange resins, hydrotalcites, spinels, copper oxides, zinc oxide, sodium oxide, calcium oxide, magnesium oxide, metal loaded zeolites, molecular sieve 13X, and the like, or combinations thereof. The scrubber 70 can comprise chloride adsorbers in a fixed bed, in a fluidized bed, in an ebullated bed, or combinations thereof.

At least a portion of the steam cracker product stream 51 and/or at least a portion of the treated gas stream 71 can be introduced to the second separating unit 60 to produce an olefin gas stream 61, a saturated hydrocarbons gas stream 62, an aromatics stream 63, and a heavies stream 64; wherein the olefin gas stream 61 comprises ethylene, propylene, butene, butadiene, or combinations thereof; wherein the saturated hydrocarbons gas stream 62 comprises methane, ethane, propanes, butanes, hydrogen, or combinations thereof; wherein the aromatics stream 63 comprises $C_6$ to $C_8$ aromatic hydrocarbons; and wherein the heavies stream 64 comprises $C_{5+}$ hydrocarbons other than $C_6$-$C_8$ aromatic hydrocarbons. Generally, the treated gas stream 71 can comprise hydrogen, methane, ethane, ethylene, propanes, propylene, butanes, butane, butadiene, n-butenes, iso-butenes, cis-butene, trans-butene, and the like, or combinations thereof. As will be appreciated by one of skill in the art, and with the help of this disclosure, the $C_{5+}$ hydrocarbons of the heavies stream 64 (*i*) exclude $C_6$ to $C_8$ aromatic hydrocarbons; (ii) include $C_{9+}$ aromatic hydrocarbons; (iii) include $C_{5+}$ olefins; and (iv) include $C_{5+}$ paraffins, iso-paraffins and naphthenes.

A process for processing mixed plastics comprising simultaneous pyrolysis and dechlorination of the mixed plastics can comprise the steps of (a) contacting the mixed plastics with a zeolitic catalyst in a pyrolysis unit at a pyrolysis temperature of from about 300° C. to about 500° C. to produce a hydrocarbon product, wherein the hydrocarbon product comprises a gas phase and a liquid phase, and wherein the zeolitic catalyst comprises medium pore zeolites and/or large pore zeolites with a silicon to aluminum ratio of from about 10 to about 750, and wherein a $H_2$ containing gas is fed to the pyrolysis unit with to enhance dechlorination; (b) separating the hydrocarbon product into a hydrocarbon gas stream and a hydrocarbon liquid stream, wherein the hydrocarbon gas stream comprises at least a portion of the gas phase of the hydrocarbon product, wherein the hydrocarbon liquid stream comprises at least a portion of the liquid phase of the hydrocarbon product, wherein the hydrocarbon liquid stream comprises one or more chloride compounds in an amount of less than about 50 ppmw chloride, based on the total weight of the hydrocarbon liquid stream, and wherein the hydrocarbon liquid stream is characterized by a viscosity of less than about 400 cP at a temperature of 300° C.; (c) conveying at least a portion of the hydrocarbon liquid stream to a first hydroprocessing unit to produce a first treated hydrocarbon liquid stream and a first hydroprocessing unit gas product stream, wherein the first treated hydrocarbon liquid stream is characterized by a boiling point that is lower than a boiling point of the hydrocarbon liquid stream, wherein the first treated hydrocarbon liquid stream is characterized by a viscosity that is lower than the viscosity of the hydrocarbon liquid stream, and wherein the first treated hydrocarbon liquid stream is characterized by a chloride content of less than 5 ppmw chloride, based on the total weight of the first treated hydrocarbon liquid stream; (d) spraying at least a portion of the first hydrocarbon liquid stream as droplets (e.g., feeding at least a portion of the first hydrocarbon liquid stream) into a fluid catalytic cracker operated in hydropyrolysis mode to produce a second treated hydrocarbon liquid stream and a fluid catalytic cracker gas product stream, wherein the droplets are characterized by an average droplet size of less than about 300 microns, wherein the second treated hydrocarbon liquid stream comprises one or more chloride compounds in an amount of less than about 5 ppmw chloride, based on the total weight of the second treated hydrocarbon liquid stream, wherein the second treated hydrocarbon liquid stream is characterized by an aromatics content of greater than about 70 wt. % aromatics, based on the total weight of the second treated hydrocarbon liquid stream, and wherein the second treated hydrocarbon liquid stream is characterized by an olefin content of less than about 1 wt. %, based on the total weight of the second treated hydrocarbon liquid stream; (e) introducing at least a portion of the first treated hydrocarbon liquid stream to a steam cracker to produce a steam cracker product stream, wherein an amount of olefins in the steam cracker product stream is greater than an amount of olefins in the first treated hydrocarbon liquid stream; and (f) introducing at least a portion of the hydrocarbon gas stream, at least a portion of the steam cracker product stream, at least a portion of the first hydroprocessing unit gas product stream, at least a portion of the second hydroprocessing unit gas product stream, or combinations thereof to a separating unit to produce an olefin gas stream, a saturated hydrocarbons gas stream, an aromatics stream, and a heavies stream; wherein the olefin gas stream comprises ethylene, propylene, butenes, butadiene, or combinations thereof; wherein the saturated hydrocarbons gas stream comprises methane, ethane, propanes, butanes, hydrogen, or combinations thereof; wherein the aromatics stream comprises $C_6$ to $C_8$ aromatic hydrocarbons; and wherein the heavies stream comprises $C_{5+}$ hydrocarbons other than $C_6$ to $C_8$ aromatic hydrocarbons.

A process for processing mixed plastics comprising simultaneous pyrolysis and dechlorination of the mixed plastics can comprise the steps of (a) contacting the mixed plastics with a zeolitic catalyst in a pyrolysis unit at a pyrolysis temperature of from about 300° C. to about 500° C. to produce a hydrocarbon product, wherein the hydrocarbon product comprises a gas phase and a liquid phase, and wherein the zeolitic catalyst comprises medium pore zeolites and/or large pore zeolites with a silicon to aluminum ratio of from about 10 to about 750; (b) separating the hydrocarbon product into a hydrocarbon gas stream and a hydrocarbon liquid stream, wherein the hydrocarbon gas stream comprises at least a portion of the gas phase of the hydrocarbon product, wherein the hydrocarbon gas stream comprises hydrochloric acid (HCl), wherein the hydrocarbon liquid stream comprises at least a portion of the liquid phase of the hydrocarbon product, wherein the hydrocarbon liquid stream comprises one or more chloride compounds in an amount of less than about 50 ppmw chloride, based on the total weight of the hydrocarbon liquid stream, and wherein the hydrocarbon liquid stream is characterized by a viscosity of less than about 400 cP at a temperature of 300° C.; (c) conveying at least a portion of the hydrocarbon liquid stream to a first hydroprocessing unit to produce a first treated hydrocarbon liquid stream and a first hydroprocessing unit gas product stream, wherein the first treated hydrocarbon liquid stream is characterized by a boiling point that is lower than a boiling point of the hydrocarbon liquid stream, wherein the first treated hydrocarbon liquid stream is characterized by a viscosity that is lower than the viscosity of the hydrocarbon liquid stream, and wherein the first treated hydrocarbon liquid stream is characterized by a chloride content of less than 5 ppmw chloride, based on the total weight of the first treated hydrocarbon liquid stream; (d) spraying at least a portion of the first treated hydrocarbon liquid stream as droplets into a fluid catalytic cracker operated in a hydropyrolysis mode to produce a second treated hydrocarbon liquid stream and a fluid catalytic cracker gas product stream, wherein the droplets are characterized by an average droplet size of less than about 300 microns, wherein the second treated hydrocarbon liquid stream comprises one or more chloride compounds in an amount of less than about 5 ppmw chloride, based on the total weight of the second treated hydrocarbon liquid stream, and wherein the second treated hydrocarbon liquid stream is characterized by an aromatics content of greater than about 50 wt. % aromatics, based on the total weight of the second treated hydrocarbon liquid stream; (e) feeding at least a portion of the first treated hydrocarbon liquid stream to a steam cracker to produce a steam cracker product stream, wherein an amount of olefins in the steam cracker product stream is greater than an amount of olefins in the first treated hydrocarbon liquid stream; (f) introducing at least a portion of the hydrocarbon gas stream, at least a portion of the first hydroprocessing unit gas product stream, at least a portion of the fluid catalytic cracker gas product stream, or combinations thereof to a scrubber to produce a treated gas stream, wherein a chloride content of the treated gas stream is less than a chloride content of the hydrocarbon gas stream, the first hydroprocessing unit gas product stream, the fluid catalytic cracker gas product stream, or combinations thereof, respectively; and wherein at least a portion of the HCl in the hydrocarbon gas stream is removed in the scrubber; and (g) introducing at least a portion of the treated gas stream and at least a portion of the steam cracker product stream to a separating unit to produce an olefin gas stream, a saturated hydrocarbons gas stream, an aromatics stream, and a heavies stream; wherein the olefin gas stream comprises ethylene, propylene, butenes, butadiene, or combinations thereof; wherein the saturated hydrocarbons gas stream comprises methane, ethane, propane, butanes, hydrogen, or combinations thereof; wherein the aromatics stream comprises $C_6$ to $C_8$ aromatic hydrocarbons; and wherein the heavies stream comprises $C_{5+}$ hydrocarbons other than $C_6$ to $C_8$ aromatic hydrocarbons.

A process for processing mixed plastics comprising simultaneous pyrolysis and dechlorination of the mixed plastics can comprise the steps of (a) contacting the mixed plastics with a zeolitic catalyst in a pyrolysis unit at a pyrolysis temperature of from about 300° C. to about 500° C. to produce a hydrocarbon product, wherein the hydrocarbon product comprises a gas phase and a liquid phase, and wherein the zeolitic catalyst comprises medium pore zeolites and/or large pore zeolites with a silicon to aluminum ratio of from about 10 to about 750; (b) separating the hydrocarbon product into a hydrocarbon gas stream and a hydrocarbon liquid stream, wherein the hydrocarbon gas stream comprises at least a portion of the gas phase of the hydrocarbon product, wherein the hydrocarbon gas stream comprises hydrochloric acid (HCl), wherein the hydrocarbon liquid stream comprises at least a portion of the liquid phase of the hydrocarbon product, wherein the hydrocarbon liquid stream comprises one or more chloride compounds in an amount of less than about 50 ppmw chloride, based on the total weight of the hydrocarbon liquid stream, and wherein the hydrocarbon liquid stream is characterized by a viscosity of less than about 400 cP at a temperature of 300° C.; (c) conveying at least a portion of the hydrocarbon liquid stream to a first hydroprocessing unit to produce a first treated hydrocarbon liquid stream and a first hydroprocessing unit gas product stream, wherein the first treated hydrocarbon liquid stream is characterized by a boiling point that is lower than a boiling point of the hydrocarbon liquid stream, wherein the first treated hydrocarbon liquid stream is characterized by a viscosity that is lower than the viscosity of the hydrocarbon liquid stream, and wherein the first treated hydrocarbon liquid stream is characterized by a chloride content of less than 5 ppmw chloride, based on the total weight of the first treated hydrocarbon liquid stream; (d) feeding at least a portion of the first treated hydrocarbon liquid stream into a second hydroprocessing unit to produce a second treated hydrocarbon liquid stream and a second hydroprocessing unit gas stream, wherein the second hydroprocessing unit can be a hydrocracker, a hydrotreater, or a hydrodealkylation unit, wherein the second treated hydrocarbon liquid stream comprises one or more chloride compounds in an amount of less than about 5 ppmw chloride, based on the total weight of the second treated hydrocarbon liquid stream, wherein the second treated hydrocarbon liquid stream is characterized by an olefin content of less than about 1 wt. %, based on the total weight of the second treated hydrocarbon liquid stream, wherein the second treated hydrocarbon liquid stream comprises aromatic hydrocarbons, and wherein equal to or greater than about 90 wt. % of the aromatic hydrocarbons of the second treated hydrocarbon liquid stream are monoaromatic hydrocarbons; (e) feeding at least a portion of the first treated hydrocarbon liquid stream to a steam cracker to produce a steam cracker product stream, wherein an amount of olefins in the steam cracker product stream is greater than an amount of olefins in the first treated hydrocarbon liquid stream; (f) introducing at least a portion of the hydrocarbon gas stream, at least a portion of the first hydroprocessing unit gas product stream, at least a portion of the second hydroprocessing unit gas stream, or combinations thereof to a scrubber to produce a treated gas stream, wherein a chloride content of the treated gas stream is less than a chloride content of the hydrocarbon gas stream, the first hydroprocessing unit gas product stream, the second hydroprocessing unit gas stream, or combinations thereof, respectively; and wherein at least a portion of the HCl in the hydrocarbon gas stream is removed in the scrubber; and (g) introducing at least a portion of the treated gas stream and at least a portion of the steam cracker product stream to a separating unit to produce an olefin gas stream, a saturated hydrocarbons gas stream, an aromatics stream, and a heavies stream; wherein the olefin gas stream comprises ethylene, propylene, butene, butadiene, or combinations thereof; wherein the saturated hydrocarbons gas stream comprises methane, ethane, propane, butanes, hydrogen, or combinations thereof; wherein the aromatics stream comprises $C_6$ to $C_8$ aromatic hydrocarbons; and wherein the heavies stream comprises $C_{5+}$ hydrocarbons other than $C_6$ to $C_8$ aromatic hydrocarbons.

Processes for processing mixed plastics as disclosed herein can advantageously display improvements in one or more process characteristics when compared to otherwise similar processes that do not employ simultaneous pyrolysis and dechlorination of the mixed plastics. Processes for processing mixed plastics as disclosed herein can advantageously reduce the total chloride content in the produced pyrolysis oils to ppm levels, which can be difficult to achieve in an otherwise similar pyrolysis process that does not dechlorinate simultaneously with the pyrolysis. Processes for processing mixed plastics as disclosed herein can advantageously employ low-cost zeolitic catalysts during pyrolysis to achieve high dechlorination efficiency of mixed plastics.

The use of zeolitic catalysts during pyrolysis as disclosed herein can advantageously and effectively lower the chloride content and viscosity of the plastics by simultaneous cracking and dechlorinating (or dehalogenating) the polymeric mixture containing chlorides (e.g., PVC and/or PVDC) at low temperatures, e.g., below 500° C. In some aspects, a chloride content can be decreased from 10,000 ppm in mixed plastics to less than 40 ppm in the hydrocarbon product. The viscosity of the mixed plastics can be decreased from about 100,000 cP at 300° C. to less than about 400 cP at 300° C. for the hydrocarbon product stream, and as such the hydrocarbon product stream is advantageously amenable to spraying as fine droplets in fluid catalytic cracker-type feed injection nozzles. As will be appreciated by one of skill in the art, and with the help of his disclosure, a much better cracking of the feed can occur for low viscosity feeds sprayed into a fluid catalytic cracker, when compared to high viscosity feeds. Further, when a reduced viscosity liquid is sprayed as fine drops in the fluid catalytic cracker, less coke is produced as a result of good atomization of feed.

The pyrolysis and dechlorination system 100 as illustrated in FIG. 1 can advantageously utilize a minimum number of treatment steps, and as such can advantageously be cost-effective for chloride removal from mixed plastics feed, by minimizing both capital and operational expenditures. As will be appreciated by one of skill in the art, and with the help of this disclosure, the pyrolysis and dechlorination system 100 may require more expensive materials of construction for the pyrolysis unit due to its handling of majority of the load of dechlorination.

The pyrolysis and dechlorination system 100 as illustrated in FIG. 1 can be advantageously used for processing PVC rich mixed plastics feed by lowering the mixed plastics viscosity in the pyrolysis unit. Without wishing to be limited by theory, due to the nature of feed, the pyrolysis and dechlorination system 100 will allow for the formation of fewer organic chlorides when compared to a pyrolysis unit that does not dechlorinate simultaneously with the pyrolysis.

In some aspects, the processes for processing mixed plastics as disclosed herein can advantageously display effective dechlorination (e.g., a high degree of dechlorination) along with high yield of liquid product when the pyrolysis unit is operated with metal loaded zeolite catalysts along with a continuous gas purge, as it can be seen in the examples provided herein. Additional advantages of the processes for processing mixed plastics as disclosed herein can be apparent to one of skill in the art viewing this disclosure.

EXAMPLES

The subject matter having been generally described, the following examples are given as particular embodiments of the disclosure and to demonstrate the practice and advantages thereof. It is understood that the examples are given by way of illustration and are not intended to limit the specification of the claims to follow in any manner.

Example 1

The pyrolysis of 100 g of mixed plastic comprising 19 g high-density polyethylene (HDPE), 21 g low-density polyethylene (LDPE), 24 g polypropylene (PP), 18 g linear low-density polyethylene (LLDPE), 11 g polystyrene (PS), 7 g polyethylene terephthalate (PET), and 2 g polyvinylchloride (PVC) in the presence of 2 g ZSM-5 catalyst was investigated in a round bottom flask set-up. A low severity pyrolysis was performed with PVC present in the feed. The plastic mixture was placed in a round bottom flask and was heated to reach a temperature of 380° C. The plastic mixture began to melt, crack and slowly started to reflux. A good amount of refluxing was observed. Nitrogen was bubbled continuously throughout the experiment to ensure that the gases liberated were flushed out and passed through an alkali scrubber to quench the HCl liberated. The heating was continued for 4 hours, and after 4 hours the heating was stopped, and the contents of the flask were allowed to cool to 300° C. by loss of heat to ambient air. The liquid obtained in the round bottom flask was poured into a petri-dish and was allowed to attain ambient temperature so as to solidify to produce solid samples. About 73 g of pourable liquid was collected. This pourable liquid material was further analyzed for chloride content and viscosity. The product chloride content was measured using a Chlora M-series analyzer (monochromatic wavelength dispersive X-ray Fluorescence technique, ASTM D7536). The solid samples were heated to melt and the viscosity was measured at different temperatures using a Brookfield digital viscometer.

Several experiments were carried out in a round bottom flask as described above and as outlined in Table 1.

TABLE 1

| Experiment No. | Substrate | Weight of Substrate (g) | Qty of ZSM-5 catalyst (g) | Temp ° C. | Comments |
|---|---|---|---|---|---|
| Comparative Example | Mixed Plastic + PVC | 100 g plastics + 2 g PVC | 0 (no zeolitic catalyst) | 360 | A solid resinous lump was obtained that could not be poured out even at 360° C. |
| 1 | Mixed Plastic + PVC | 100 g plastics + 2 g PVC | 2 (ZSM-5 CAT-1) | 360 | After 2 hrs of $N_2$ purging, 50 ppmw Cl were detected; after further purging for 5 more hours, Cl was below detection limit. 73 g of pourable liquid were collected. |
| 2 | Mixed Plastic + PVC | 25 g plastics + 0.5 g PVC | 25 (ZSM-5 CAT-2) | 360 | $N_2$ purging with stirring. Catalyst to feed ratio 1:1. Conditions similar to comparative experiment. A different grade of ZSM-5 catalyst (ZSM-5 CAT-2) was used and was not active. Lumps of partially cracked material were obtained. 700 ppmw of Cl were detected. |
| 3 | Mixed Plastic + PVC | 100 g plastics + 2 g PVC | 2 (ZSM-5 CAT-1) | 385 | Experiment #1 was repeated and 60 ppmw Cl was detected after 3 hrs of $N_2$ purge. |
| 4 | Mixed Plastic + PVC without PET | 100 g plastics (with PVC) | 20 (ZSM-5 CAT-1) | 385 | No nitrogen purging and experiment was carried out for 4 hrs at 385° C. Cl content was detected to be <40 ppmw in the residue. 67 g of pourable liquid were obtained. |

Figure 2A:
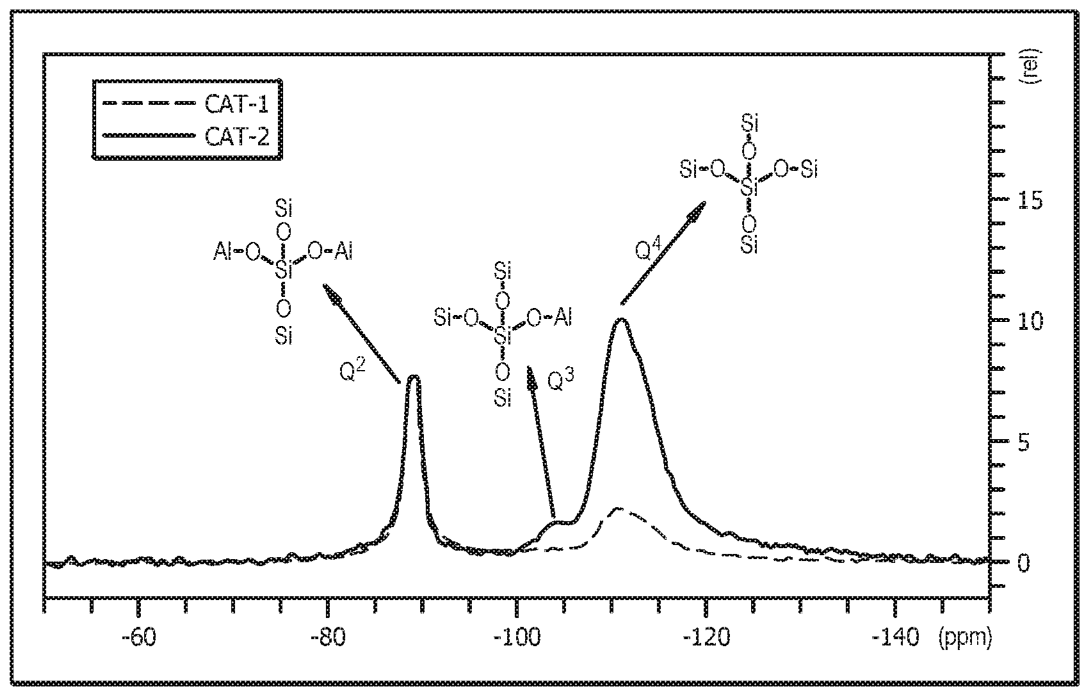
FIGS. 2A and 2B display solid state nuclear magnetic resonance spectra of different zeolitic catalysts.
Figure 2B:
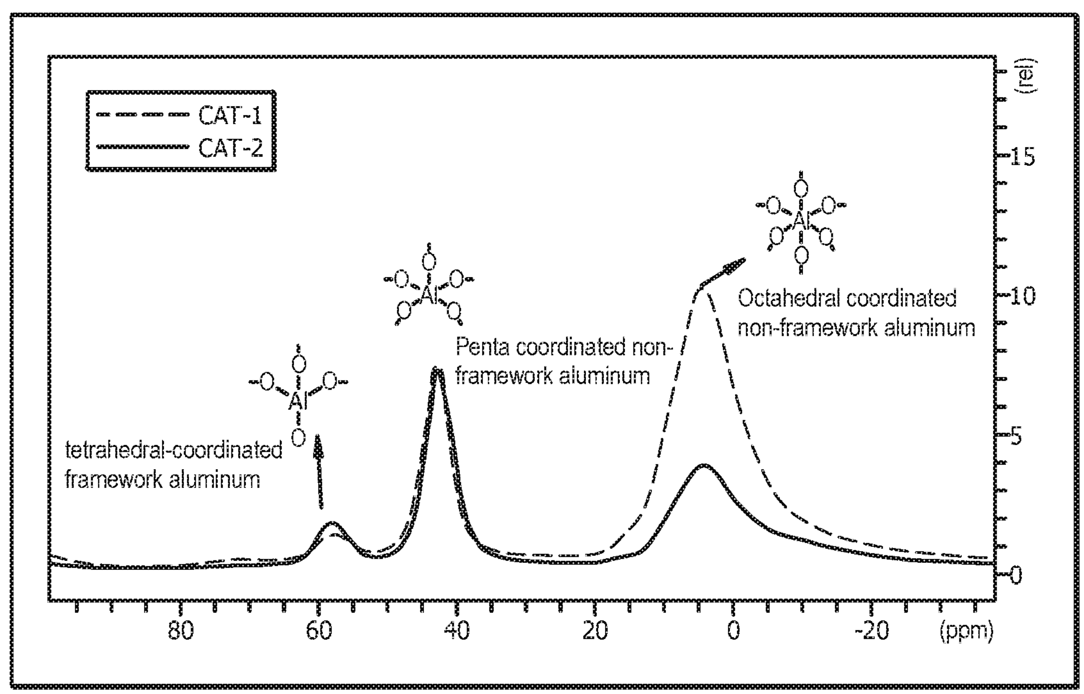

ZSM-5 CAT-1 and ZSM-5 CAT-2 were employed in experiments. Solid state nuclear magnetic resonance (NMR) spectroscopy was performed on ZSM-5 CAT-1 and ZSM-5 CAT-2 samples on a 400 MHz Bruker instrument at room temperature using 4 mm a magic angle spinning (MAS) probe with a spinning speed of 10 KHz using 4.2 μs pulse and 5 s delay. Catalysts ZSM-5 CAT-1 and ZSM-5 CAT-2 showed a Si/Al ratio of 3.4 and 7.4, respectively. Also the non-framework aluminum in ZSM-5 CAT-1 is much higher than in ZSM-5 CAT-2, and this could result in an enhanced Lewis acidity of CAT-1 which is responsible for its higher activity. FIGS. 2A and 2B display solid state NMR spectra of ZSM-5 CAT-1 and ZSM-5 CAT-2. FIG. 2A indicates that ZSM-5 CAT-1 has less silicon content ($Q^4$) than ZSM-5 CAT-2. FIG. 2B displays $^{27}$Al MAS NMR of ZSM-5 CAT-1 and ZSM-5 CAT-2, indicating that ZSM-5 CAT-1 displays more octahedral aluminum species when compared with the ZSM-5 CAT-2.

Experiment 1 in Table 1 was carried out on a 100 g scale with 2 wt. % catalyst loading. The experiment was carried out completely under $N_2$ atmosphere by bubbling $N_2$ into the mixture for 2 hrs. The reaction was stopped and samples were analyzed for Cl content, which was found to be 50 ppmw. A hydrocarbon gas loss of 5% was observed. $N_2$ bubbling was resumed and continued for 5 more hours, and the sample was again analyzed for Cl content. This time the Cl content was below detection limit. This indicates that the Cl in the polymeric wax was in a form that can be flushed out by $N_2$. After the second period of 5 hours of nitrogen purging, 7% loss of gaseous hydrocarbons was observed.

Experiment 2 in Table 1 was carried out with a different ZSM-5 catalyst which was not as effective (under the given condition) as the one used in the Experiment 1.

Experiment 3 was a repetition of Experiment 1. The resulting hydrocarbon product was analyzed for Cl content, which was found to contain 60 ppmw chloride.

Presence of PET along with PVC could contribute to the production of more organic chlorides. Without wishing to be limited by theory, PET interacts with HCl released from PVC, forming significant amounts of various chlorocompounds—mainly chloroethyl esters of terephthalic and benzoic acids. Further, derivatives possessing chlorine directly connected to the aromatic ring can also be formed.

Experiment 4 was done with mixed plastic feed with PVC and without PET to assess the residue chlorine. In the absence of PET, the chloride content was reduced from 10,000 ppmw to <40 ppmw without nitrogen purge. The data in Table 1 indicate that there is a reduction in chloride content. Without wishing to be limited by theory, such reduction in chloride content would be possible if the HCl as released does not recombine to form organic chlorides with benzoic acids and the phthalates from PET.

Example 2

The pyrolysis of 100 g of mixed plastic comprising 19 g high-density polyethylene (HDPE), 21 g low-density polyethylene (LDPE), 24 g polypropylene (PP), 18 g linear low-density polyethylene (LLDPE), 11 g polystyrene (PS), 7 g polyethylene terephthalate (PET), and 2 g polyvinylchloride (PVC) in the presence of ZSM-5 catalyst was investigated in a stainless steel (SS) reactor set-up, wherein the SS reactor was connected to a SS receiver. The reactor (e.g., pot) was heated using heating tapes with a temperature controller. The mixed plastic was charged along with the catalyst into the reactor, and the reactor was heated to 450° C. over a period of 1 hour. The temperature was maintained constant at 450° C. for another hour, when all the cracked products were carried out of the reactor into the receiver. A SS tube connecting the reactor and receiver was also maintained at 450° C. and packed with the same catalyst (ZSM-5). The catalyst used was split between the pot and the head space tube by keeping 5 g of catalyst in the tube and rest in pot. The outgoing gas was passed through a NaOH scrubber to trap HCl gas. The product was analyzed by a detailed hydrocarbon analysis (DHA); and GC and simulated distillation (SIMDIS) GC, as per analytical methods ASTM D6730 and ASTM D6852, respectively. The product was analyzed for total chloride by ion chromatography.

Several experiments were carried out in a SS reactor as described above and as outlined in Table 2.

TABLE 2

| Experiment No. | Substrate | Weight of Substrate (g) | Qty of ZSM-5 catalyst (g) | Temp ° C. | Comments |
|---|---|---|---|---|---|
| 5 | Mixed Plastic without PVC | 100 | 10 (ZSM-5 CAT-1) | 450 | The liquid produced was analyzed for its boiling point distillation curve. Based on this SIMDIS results, it was clear that 70-75% of liquid product boiled in the gasoline range (initial boiling point (IBP) −220° C.) and 15-20% boiled in the diesel range (221-370° C.). The aromatic content in the liquid product was about 46-65% and the liquid olefinic content was about 7-12%, which meant the liquid product could not be fed directly to a steam cracker. |
| 6 | Mixed Plastic without PVC | 100 | 20 (ZSM-5 CAT-1) | 450 | |

Note: During the experiments, lines were chocked and the material had to be removed by dissolving in toluene multiple times, and the mass balance data were calculated.

Boiling point distribution table (Table 3) for Experiment 5 (exp-5) and Experiment 6 (Exp-6) (FIG. 3) show that with the catalyst used, the % of heavier compounds boiling above 370° C. is reduced. Also, DHA results indicated that higher amount of catalyst used results in a higher aromatic concentration. When it would be required to increase aromatics, catalyst used (e.g., catalyst concentration) with respect to feed could be increased. DHA for the products obtained in Experiments 5 and 6 are shown in Table 3. High olefin and aromatic content in the pyrolysis liquid product in Experiments 5 and 6 prevents feeding this material directly to a steam cracker.

TABLE 3

| Product composition | Experiment 5 | Experiment 6 |
|---|---|---|
| Paraffins | 6.5 | 3.1 |
| Isoparaffins | 17.6 | 11.7 |
| Olefins | 11.4 | 7.4 |
| Naphthenes | 3.8 | 2.5 |
| Aromatics | 47.9 | 66.3 |
| Heavies | 3.1 | 3.6 |
| Unknown | 9.8 | 5.5 |

Figure 3:
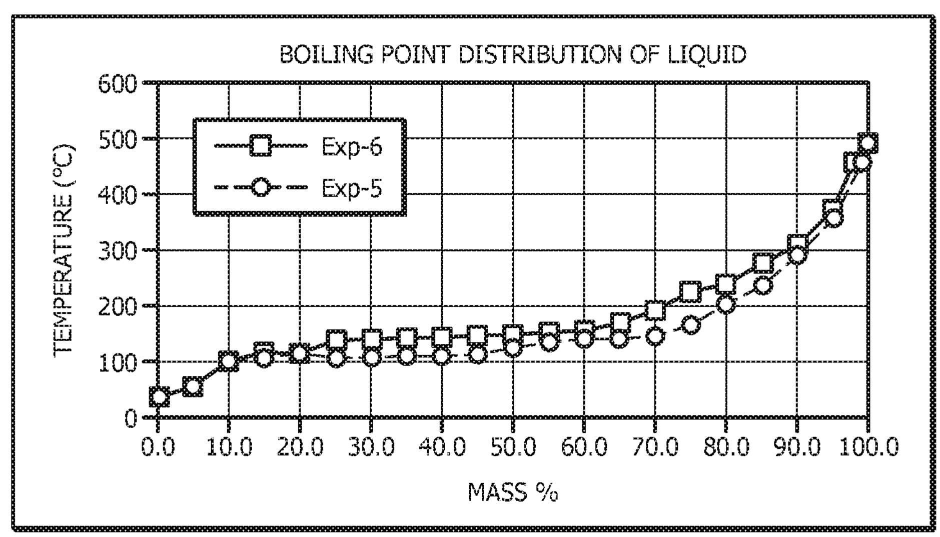
FIG. 3 displays a displays a graph of a boiling point distribution for a hydrocarbon liquid product obtained by simultaneous pyrolysis and dechlorination.

FIG. 3 displays a graph of the boiling point distribution of the products obtained in Experiments 5 and 6. The results in FIG. 3 and Table 3 show that approximately 95% of the liquid product boils below 370° C.

Example 3

The pyrolysis of a mixed plastic feed was investigated. More specifically, the viscosity of the pyrolysis product was investigated as a function of cracking temperature along with in-situ scavenging of chlorides by heating PVC-containing plastic feed mixtures in the presence of metal and non-metal loaded catalysts.

Feed Preparation.

A series of thermo-catalytic cracking experiments were performed in a round bottom flask (RBF) using waste plastic model feed mixtures. The composition of the feed mixtures used in this study is shown in data Table 4 displayed in FIG. 4A. PET was used in the feed mixture for all RBF runs from 1 to 6, except for run 5. To about 100 g of the plastic feed mixture containing HDPE, LDPE, LLDPE, PVC, PS, PP, and PET, 5 g of ZSM-5 zeolite catalyst CAT-1 with or without metal loading was added and placed in an RBF. The above mixture of feed and catalyst was thoroughly mixed in the RBF with a SS spatula prior to the run to ensure thorough mixing of feed and catalyst, to ensure proper feed cracking.

Feed Heating.

The feed mixture was subjected to heating using an external mantle heater with a PID temperature controller along with the assistance of magnetic stirring. Further, the plastic feed mixture was heated to a maximum cracking temperature of 360° C. with a reaction hold time of 20 min, after reaching the targeted temperature conditions. Temperature overshooting in the RBF was avoided by using an incremental step heating. An incremental step of 50° C. was used during heating from initial temperature (ambient) to 300° C., and then an incremental step of 10° C. was used up to a maximum feed cracking temperature of 360° C.

Catalyst Loading.

Catalyst ZSM-5 CAT-1 was used as a baseline catalyst (e.g., base catalyst) for RBF run #1. However, Mg loaded ZSM-5 CAT-1 was used exclusively or in a combination with the base catalyst for all other runs as shown in data Table 5 displayed in FIG. 4B. Catalyst loading and cracking temperature conditions used during the RBF runs are as shown in Table 5 displayed in FIG. 4B. For RBF runs #1 and #2, an additional hold time of 20 min was kept at 300° C., 320° C. and 340° C., prior to reaching the cracking temperature of 360° C., to mimic the axial temperature conditions prevailing in a devolatilization extrusion process.

Off-Gas Treatment.

A glass bubbler apparatus was used to maintain a constant purge of nitrogen during the RBF runs to ensure an oxygen free reaction environment and stripping of chlorides liberated from the feed mixture. The gas mixture containing nitrogen and light volatile hydrocarbons was passed through a glass condenser with a water cooling temperature of 10° C. Further, a caustic bath containing freshly prepared NaOH solution (20% w/w) was used to trap the chlorides formed during the thermo-catalytic cracking. Around 300° C. RBF temperature, a visual color change was observed as the chlorides got trapped in the caustic bath (by bubbling of gases from the RBF), from transparent to yellowish green.

Mass Balance Closure.

No visible condensation was observed (as a separate hydrocarbon layer above caustic solution in the bubbler) due to the carryover of volatile hydrocarbons from RBF to the condenser to the caustic apparatus. Mass balance closure for all the RBF runs ranged from 89.23 wt. % to 97.32 wt. %, as shown in Table 5 displayed in FIG. 4B. The losses were primarily accounted as hydrocarbon gases or volatiles escaping from RBF during leaks ranging from 2.68 wt. % to 10.77 wt. %.

Sample Collection and Analysis.

After the cracking reaction was complete, the hot melt from RBF was poured onto a quartz Petri dish, while decanting the top melt layer from the bottom layer containing mostly catalyst particles with wax and coke deposits. After ambient cooling, the top layer became a solid cake which was reheated for viscosity and chloride analysis. Decanting operation of the melt was performed carefully in the hood to prevent the flashing of organic vapors and bubble formation.

Plastic Melt Viscosity.

The plastic melt viscosity was measured as a function of cell temperature from 200° C. to 350° C. using a Brookfield RV DV II viscometer with a spindle 05. The samples were conditioned at 200° C. for 20 mins in 100 mL beaker before start of measurements. A measuring spindle (spindle No. 05) was inserted in the sample and was heated to the respective temperature (200° C.). Pre-shearing was performed for 2 min to homogenize the samples after reaching steady state temperature of 200° C. in the viscosity measurement cell. Measurements were performed on the homogenized samples. Then, the viscosity data was recorded continuously within the measurable torque limits up to a maximum cell temperature of 350° C. The temperature was ramped from 200° C. to 350° C. and viscosity was recorded at each measurement temperature.

Chloride Analysis.

Total chloride analysis was performed for the cracked plastic melt (solid cake obtained from top layer as described above), catalyst particles and the liquid fractions obtained from solvent wash of catalyst particles. The bottom layer of catalyst particles was heated using ethyl benzene (EB) at 110° C., and the catalyst particles were recovered for secondary washing with acetone wash. After recovering the solid catalyst from filtration followed by drying the spent solvent, wash mixtures of ethyl benzene and acetone were analyzed for total chloride content independently.

Melt Viscosity Results

Figure 5A:
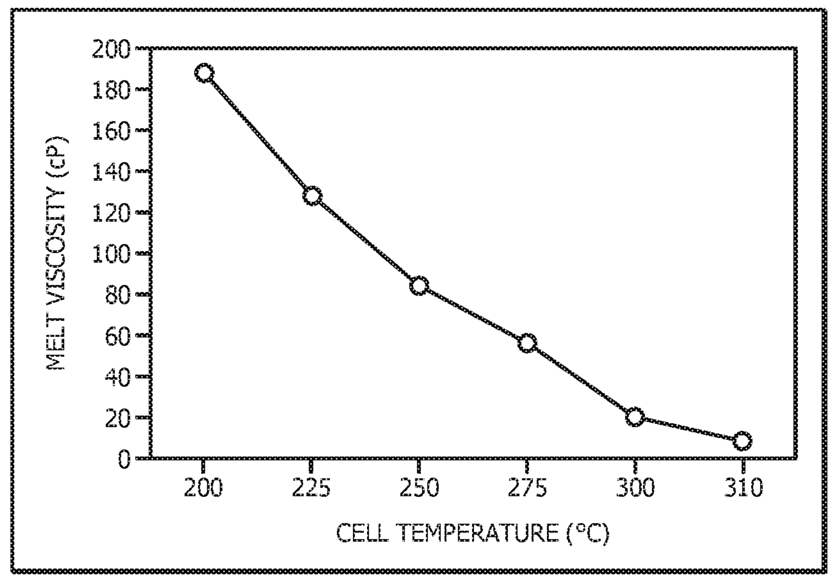
FIGS. 5A, 5B, 5C, 5D, 5E and 5F display melt viscosity data for Example 3.
Figure 5B:
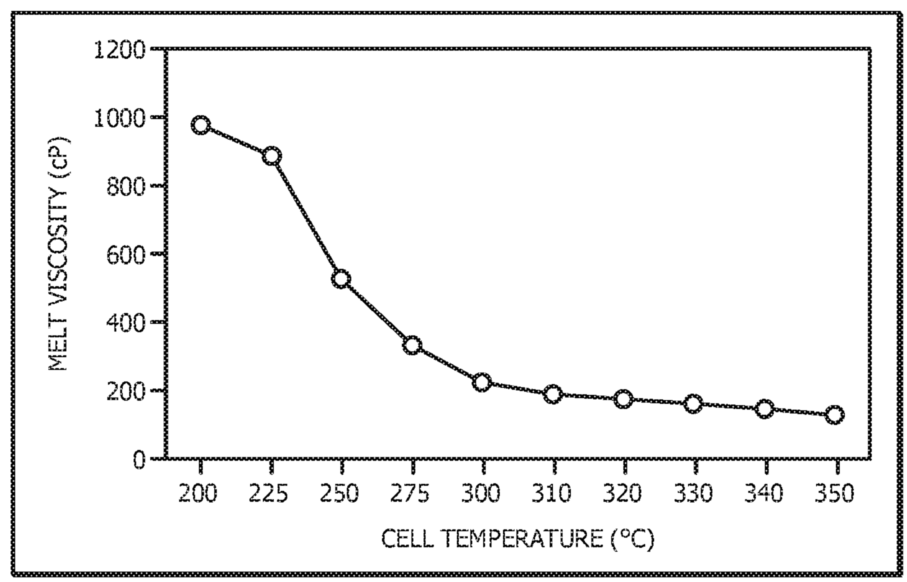
Figure 5C:
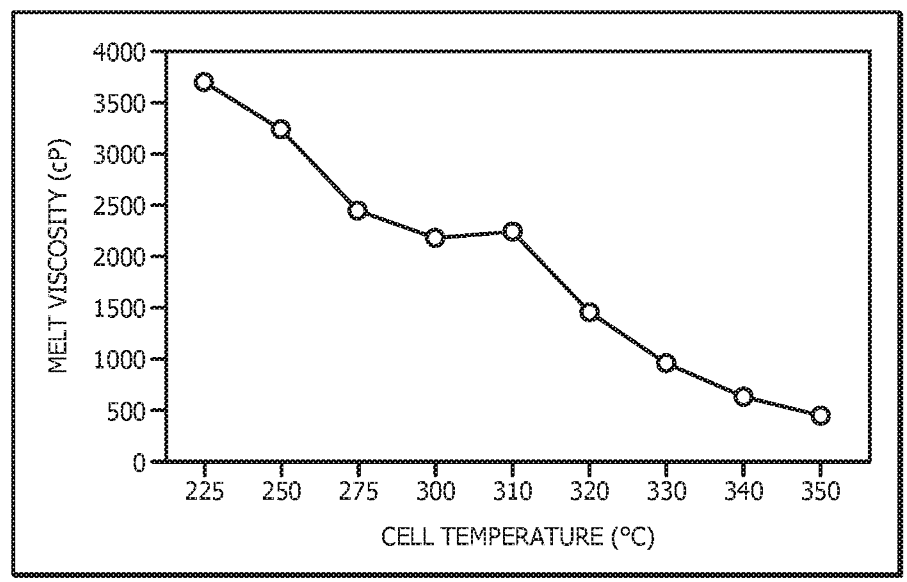
Figure 5D:
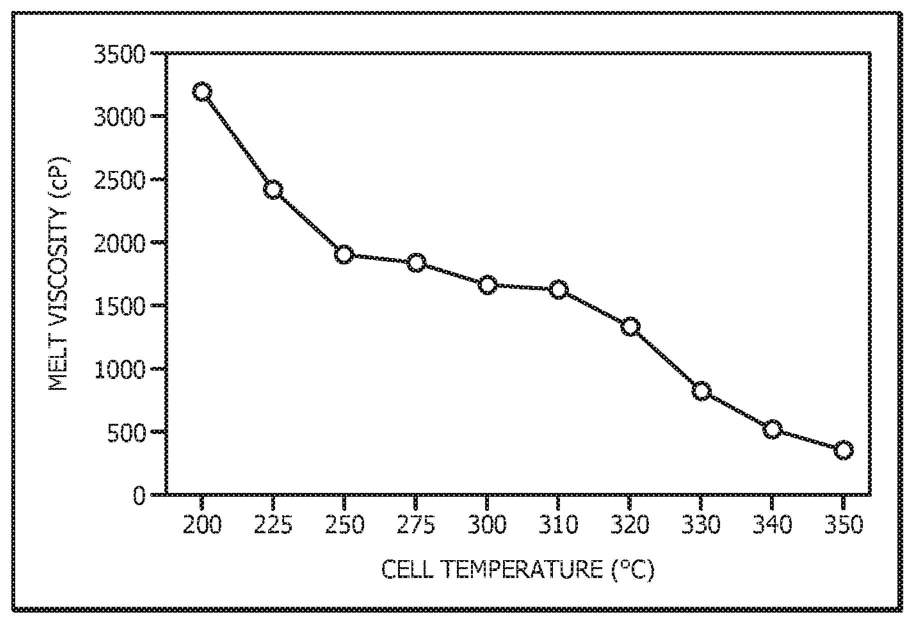
Figure 5E:
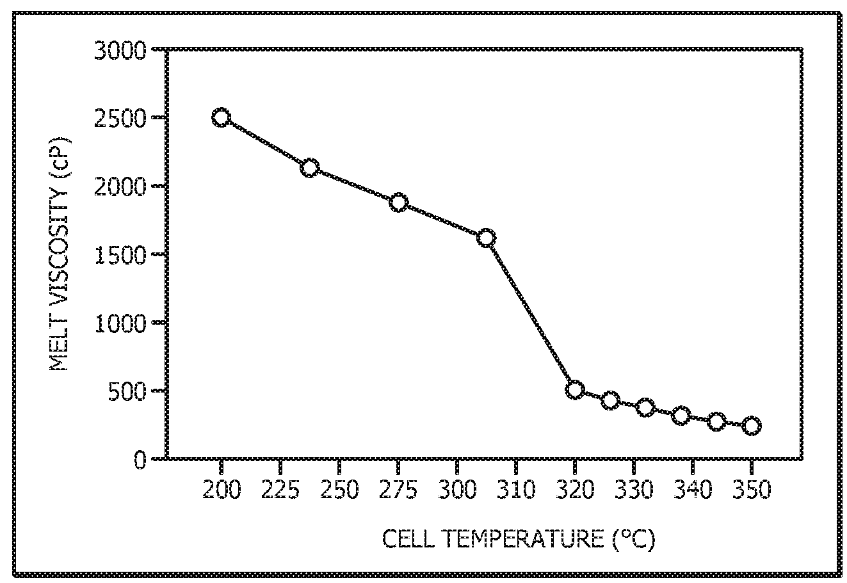
Figure 5F:
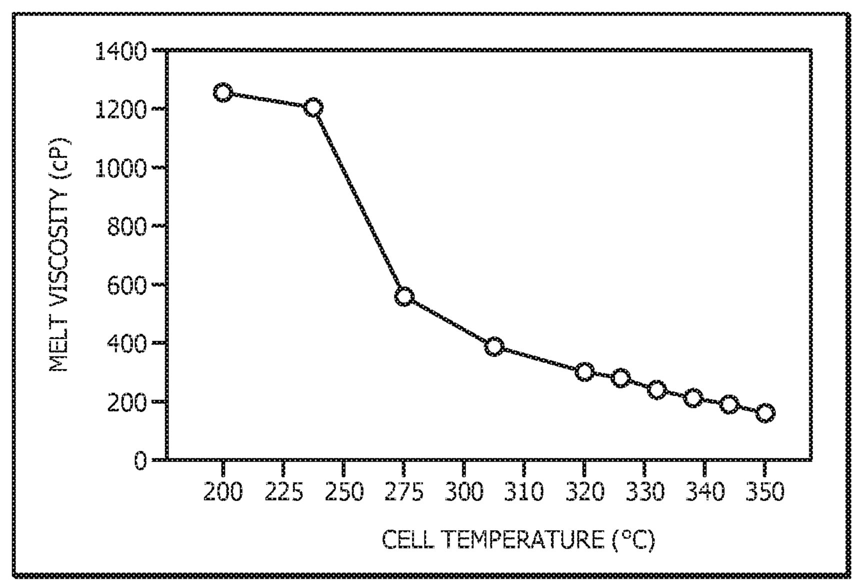

The melt viscosity data for RBF runs 1 to 6 is shown in FIGS. 5A, 5B, 5C, 5D, 5E and 5F. FIGS. 5A, 5B, 5C, 5D, 5E and 5F display melt viscosities as a function of cell temperature for RBF runs 1, 2, 3, 4, 5, and 6, respectively. The minimum viscosity was observed to be 8 cP for RBF run 1 at a corresponding measurement cell temperature of 310° C. The maximum viscosity was observed to be 3700 cP for RBF run 3 at a corresponding measurement cell temperature of 225° C. As shown in FIG. 5A, the viscosity profile for RBF run 1 indicated a sharp decrease from 188 cP to 8 cP (change of 95.74%) as the cell temperature was increased from 200° C. to 310° C. This trend reveals that the base catalyst without metal loading has highest cracking activity compared to the other three runs where the catalyst was loaded with Mg. Without wishing to be limited by theory, with the addition of Mg, the acidity of ZSM-5 CAT-1 potentially decreased and hence a decreased cracking activity was observed. A viscosity profile for RBF run 2 is displayed in FIG. 5B (the run conditions for RBF run 2 are the same as for RBF run 1 with respect to temperature, but RBF run 2 used Mg loaded ZSM-5 CAT-1 instead of the baseline catalyst which was used in RBF run 1) indicates that the viscosity dropped from 972 cP at 200° C. to 188 cP at 310° C. This shows that the degree of cracking in RBF run #2 was lower compared to that in RBF run #1. Also a comparison of FIGS. 5B, 5C, 5D and 5E shows that with increased cracking temperature, the viscosity of the product is reduced. Due to higher cracking temperature of 360° C., the initial viscosity measured at 200° C. for melt from RBF run 2 was lower by at least a factor of 3.45 as compared to the melts from RBF runs 3 and 4. The coke and wax formation was observed to be more severe in RBF runs 2 to 4. Also, as can be seen from Table 5 displayed in FIG. 4B, when the RBF temperature was lower, the loss of product as gas (volatiles %) was reduced giving better yields of melt/liquid product. However, the chloride scavenging of Mg loaded catalyst was much higher as confirmed by the total chloride analysis data in data Table 6 displayed in FIG. 4C for RBF run #5. In the case of RBF run #3 and RBF run #4, gas purge during the experiment was frequently interrupted due to leaks from glass joints, as a result of which the chloride content in these cases showed higher levels than expected. Hence, the metal loaded ZSM-5 CAT-1 resulted in good dechlorination and good liquid yield as compared to base catalyst. The base catalyst results in good dechlorination, but due to higher conversion gave an inferior liquid product yield due to loss of volatiles.

Hence, processing units employing a devolatilization extruder with downstream cracking unit as described in more detail in U.S. Provisional Patent Application No. 62/369,379 filed Aug. 1, 2016, which is incorporated by reference herein in its entirety, would maximize the liquid feed with reduced chloride content going to downstream cracking units. An overall product yield could thus be enhanced from a selective cracking in the downstream cracking units. Also, because of the reduced liquid feed chloride content, the downstream cracking units could employ more severe cracking conditions for enhanced yield of high value chemicals, such as light gas olefins and aromatics. Further, since the chloride content of feed to downstream units would be much reduced, the downstream units could employ more conventional and less expensive material of construction and could have a longer lifetime due to reduced possibility of corrosion.

As it can be seen from RBF run 6, it is also possible to use a mixture of ZSM-5 CAT-1 and Mg/metal loaded ZSM-5 CAT-1 to achieve cracking, viscosity reduction and chloride scavenging. Experiment RBF run #6 indicates that it is possible to reduce chlorides in the product to less than 1 ppm level even when a 4:1 weight ratio mixture of ZSM-5 CAT-1 and 10% Mg-ZSM-5 CAT-1 is employed. A comparison of the data in FIG. 5F (RBF run 6) and FIG. 5B (RBF run 2) indicates that a 4:1 mass ratio of ZSM-5 CAT-1 to 10% Mg-loaded ZSM-5 CAT-1 gives a greater overall reduction in viscosity as a result of more cracking as compared to the use of only Mg-loaded ZSM-5 CAT-1.

Example 4

Hydropyrolysis.

As described in U.S. Provisional Patent Application No. 62/369,379 filed Aug. 1, 2016, a cracking unit downstream of a devolatilization extruder or unit 30 in FIG. 1 of the present disclosure could be a high severity pyrolysis unit or a hydropyrolysis unit.

The yields obtained from both high severity pyrolysis and hydropyrolysis were investigated. In some aspects, hydropyrolysis can be preferred over high severity pyrolysis. An amount of 1.5 g of mixed plastics was mixed with 9 g of a catalyst mixture comprising 62.5 wt. % spent fluid catalytic cracking (FCC) catalyst and 37.5 wt. % ZSM-5 zeolitic catalyst. The combined mixture of mixed plastic and catalysts was then fed to a fluidized bed reactor. The plastic feed was in the form of a 200 micron plastic powder. A mixture of 10% $H_2$ in $N_2$ was employed as the carrier gas at a flow rate of 175 normal cc/min (in hydropyrolysis mode).

Studies were conducted by maintaining the reactor bed temperature, before a plastic feed and catalyst mixture was introduced to the reactor, at 600° C., 635° C., and 670° C., respectively, i.e., at three different starting temperatures. Studies were also conducted at the same conditions as before with 100% $N_2$ as carrier gas (high severity pyrolysis mode: same conditions as hydropyrolysis mode, except for the hydrogen, which was absent). For each of the temperature conditions studied, a new set of catalyst and plastic feed mixture was prepared and used.

The data Tables 7-12 in FIGS. 6A-6F summarize the experimental findings, wherein all experiments employed a mixed plastic feed and spent FCC (62.50 wt. %)+ZSM-5 zeolitic catalyst (37.5 wt. %) as the pyrolysis catalyst.

Overall, an yield of gas products increased and an yield of liquid products decreased, indicating higher conversions to lighter products, as displayed in the data Table 8 in FIG. 6B. As can be seen from Table 8 in FIG. 6B, the yield of light gas olefins per unit amount of coke deposited on the catalyst was higher in the case of hydropyrolysis than in the case of high severity pyrolysis. Without wishing to be limited by theory, more light gas olefins would be produced in a circulating fluid catalytic cracking (FCC) type of unit. In these circulating FCC units, performance was compared on a constant coke yield basis, because the amount of coke burnt off in the regenerator was limited by the air availability in the regenerator, and as a result the regenerated catalyst returned back to a riser reactor would have varying amounts of coke on it which would in turn affect its activity in the riser reactor.

The total aromatics, as well as $C_6$-$C_8$ aromatics yield per unit amount of coke deposited was also higher in the case of hydropyrolysis than in the case of high severity pyrolysis, as can be seen from Table 9 in FIG. 6C. Without wishing to be limited by theory, the data in Table 9 in FIG. 6C imply that in hydropyrolysis more aromatic products would be produced in a circulating FCC type of unit.

To summarize the data in Example 4, more high value chemicals (i.e., light gas olefins and aromatics) are produced in hydropyrolysis as compared to pyrolysis done without use of hydrogen carrier gas, as it can be seen from Tables 9-10 in FIGS. 6C-6D.

The data in Table 10 in FIG. 6E demonstrate additional benefits of hydropyrolysis as compared to high severity pyrolysis, such as increased olefinicity of product gases; increased ratio of propylene/propane as compared to ethylene to ethane and butenes/butanes; lower hydrogen transfer index (i.e., ratio of $C_3$ and $C_4$ saturates/$C_3$ olefins) in hydropyrolysis as compared to the use of nitrogen only as carrier gas in high severity pyrolysis; and more $C_4$ iso-olefins being produced as compared to 1-butene in hydropyrolysis (i.e., isomerization index is lower).

The DHA of liquid products boiling below 240° C. is displayed in Table 12 in FIG. 6F.

Example 5

Hydrotreating.

The liquid product (e.g., hydrocarbon liquid stream 21) produced as described in Examples 1-3 can be subjected to hydroprocessing in a hydroprocessing unit such as unit 40 in FIG. 1, with or without separation for its aromatic content in the BTX+EB range. The product from the hydroprocessing unit such as unit 40 in FIG. 1 could be completely saturated or could retain monoaromatics while saturating any multi-ring aromatics. This product (e.g., the product from the hydroprocessing unit such as unit 40 in FIG. 1) would not have any olefins or chloride content. Unit 40 in FIG. 1 could be any hydrocracking, hydrotreating or dealkylation unit operated in hydrogen environment to produce the stream 41 in FIG. 1.

Example 6

Steam Cracking.

Stream 41 in FIG. 1 of this application can be fed to steam cracker, such as steam cracker 50. A steam cracker could be used in combination with a pyrolysis unit (such as pyrolysis unit 10) and a hydroprocessing unit (such as hydroprocessing units 30 and/or 40) even if the liquid product (such as streams 31 and/or 41) contains some aromatics. Gases ($C_1$-$C_4$) from a pyrolysis unit and hydroprocessing unit can be fed to gas crackers. Liquids from the hydroprocessing unit can be fed to liquid steam crackers.

Gas steam cracking of a feed consisting of 16.75 wt. % ethane, 34.62 wt. % propane, 27.62 wt. % isobutene and 21 wt. % butane was carried out at a steam cracker coil outlet temperature of 840° C., a steam/hydrocarbon ratio of 0.35, and a coil outlet pressure of 1.7 bar, and resulted in a product having 0.48 wt. % acetylene, 34.1 wt. % ethylene, 12.21 wt. % propylene, and 2.41 wt. % butadiene, among other products.

Steam cracking of a naphtha feed (boiling cut from initial boiling point to 220° C.) having 20.3 wt. % paraffin, 27.9 wt. % i-paraffins, 14.5 wt. % aromatics, and 36.9 wt. % naphthenes was performed at a coil outlet temperature of 865° C., a coil outlet pressure of 1.7 bar, and a steam to oil ratio of 0.5, and resulted in a product having 25.86 wt. % ethylene, 12.14 wt. % propylene, and 4.98 wt. % butadiene, among other products.

Steam cracking of gas oils (boiling point greater than 220° C. and less than 380° C.) resulted in a product having 24 wt. % ethylene, 14.45 wt. % propylene, 4.7 wt. % butadiene, and 4.5 wt. % butenes, among other products.

The present disclosure is further illustrated by the following embodiments, which are not to be construed in any way as imposing limitations upon the scope thereof. On the contrary, it is to be clearly understood that resort can be had to various other aspects, embodiments, modifications, and equivalents thereof which, after reading the description herein, can be suggest to one of ordinary skill in the art without departing from the spirit of the present invention or the scope of the appended claims.

ADDITIONAL DISCLOSURE

The following are enumerated aspects which are provided as non-limiting examples.

A first aspect, which is a process for processing mixed plastics comprising simultaneous pyrolysis and dechlorination of the mixed plastics, the process comprising (a) contacting the mixed plastics with a zeolitic catalyst in a pyrolysis unit to produce a hydrocarbon product, wherein the hydrocarbon product comprises a gas phase and a liquid phase; and (b) separating the hydrocarbon product into a hydrocarbon gas stream and a hydrocarbon liquid stream, wherein the hydrocarbon gas stream comprises at least a portion of the gas phase of the hydrocarbon product, wherein the hydrocarbon liquid stream comprises at least a portion of the liquid phase of the hydrocarbon product, wherein the hydrocarbon liquid stream comprises one or more chloride compounds in an amount of less than about 100 ppmw chloride, based on the total weight of the hydrocarbon liquid stream, and wherein the hydrocarbon liquid stream is characterized by a viscosity of less than about 400 cP at a temperature of 300° C.

A second aspect, which is the process of the first aspect, wherein step (a) of contacting the mixed plastics with a zeolitic catalyst occurs at a pyrolysis temperature of from about 300° C. to about 500° C.

A third aspect, which is the process of any one of the first and the second aspects, wherein the zeolitic catalyst comprises medium pore zeolites, large pore zeolites, or combinations thereof.

A fourth aspect, which is the process of any one of the first through the third aspects, wherein the zeolitic catalyst is characterized by a pore size of from about 4.5 Å to about 8 Å.

A fifth aspect, which is the process of any one of the first through the fourth aspects, wherein the zeolitic catalyst is an acidic zeolite.

A sixth aspect, which is the process of any one of the first through the fifth aspects, wherein the zeolitic catalyst is characterized by a silicon to aluminum (Si/Al) ratio of from about 0.01 to about 1,000.

A seventh aspect, which is the process of any one of the first through the sixth aspects, wherein the zeolitic catalyst comprises one or more metals.

An eighth aspect, which is the process of the seventh aspect, wherein each metal of the one or more metals can be selected from the group consisting of titanium, nickel, copper, magnesium, tin, cobalt, iron, zinc, tungsten, vanadium, gallium, calcium, manganese, ruthenium and rhenium.

A ninth aspect, which is the process of any one of the first through the eighth aspects, wherein the zeolitic catalyst comprises ZSM-5, ZSM-11, Y, high-silica Y, USY, EU-1, EU-2, beta, mordenite, L, ferrierite, SBA-15, SAPO-5, SAPO-11, SAPO-31, SAPO-37, SAPO-41, or combinations thereof.

A tenth aspect, which is the process of any one of the first through the ninth aspects, wherein the zeolitic catalyst is characterized by an average particle size of less than 1,000 microns.

An eleventh aspect, which is the process of any one of the first through the tenth aspects, wherein the zeolitic catalyst is present in the pyrolysis unit in an amount of equal to or greater than about 1 wt. %, based on the total weight of the mixed plastics and the zeolitic catalyst.

A twelfth aspect, which is the process of any one of the first through the eleventh aspects, wherein the zeolitic catalyst is present in the pyrolysis unit in an amount of from about 2 wt. % to about 50 wt. %, based on the total weight of the mixed plastics and the zeolitic catalyst.

A thirteenth aspect, which is the process of any one of the first through the twelfth aspects, wherein the pyrolysis unit is characterized by a pressure of equal to or greater than about 0.1 bara.

A fourteenth aspect, which is the process of any one of the first through the thirteenth aspects, wherein the hydrocarbon liquid stream is characterized by a viscosity of less than about 30 cP at a temperature of 300° C.

A fifteenth aspect, which is the process of any one of the first through the fourteenth aspects, wherein the hydrocarbon liquid stream comprises one or more chloride compounds in an amount of less than about 25 ppmw chloride, based on the total weight of the hydrocarbon liquid stream.

A sixteenth aspect, which is the process of any one of the first through the fifteenth aspects, wherein the mixed plastics are characterized by a melt viscosity of equal to or greater than about 50,000 cP at a temperature of 300° C., and wherein a decrease in viscosity from the mixed plastics to the hydrocarbon liquid stream is due to pyrolysis of the mixed plastics during the step (a).

A seventeenth aspect, which is the process of any one of the first through the sixteenth aspects, wherein the pyrolysis of the mixed plastics is characterized by a conversion of equal to or greater than about 70%.

An eighteenth aspect, which is the process of any one of the first through the seventeenth aspects, wherein the mixed plastics comprise one or more chloride compounds in an amount of equal to or greater than about 400 ppmw chloride, based on the total weight of the mixed plastics, and wherein a decrease in one or more chloride compounds from the mixed plastics to the hydrocarbon liquid stream is due to dechlorination of the mixed plastics during the step (a).

A nineteenth aspect, which is the process of any one of the first through the eighteenth aspects, wherein the hydrocarbon liquid stream comprises paraffins, i-paraffins, olefins, naphthenes, aromatic compounds, organic chlorides, or combinations thereof.

A twentieth aspect, which is the process of any one of the first through the nineteenth aspects, wherein the hydrocarbon liquid stream comprises aromatic compounds in an amount of equal to or greater than about 5 wt. %, based on the total weight of the hydrocarbon liquid stream.

A twenty-first aspect, which is the process of any one of the first through the twentieth aspects, wherein the hydrocarbon liquid stream comprises olefins in an amount of equal to or greater than about 5 wt. %, based on the total weight of the hydrocarbon liquid stream.

A twenty-second aspect, which is the process of any one of the first through the twenty-first aspects, wherein equal to or greater than about 10 wt. % of the hydrocarbon liquid stream is characterized by a boiling point of less than about 370° C.

A twenty-third aspect, which is the process of any one of the first through the twenty-second aspects further comprising introducing hydrogen, $C_1$ to $C_4$ hydrocarbon gases, an inert gas, or combinations thereof to the pyrolysis unit.

A twenty-fourth aspect, which is the process of any one of the first through the twenty-third aspects, wherein at least a portion of the hydrocarbon liquid stream is conveyed to a hydroprocessing unit to produce a treated hydrocarbon liquid stream and a hydroprocessing unit gas product stream, wherein the treated hydrocarbon liquid stream is characterized by a boiling point that is lower than a boiling point of the hydrocarbon liquid stream, and wherein the treated hydrocarbon liquid stream is characterized by a viscosity that is lower than the viscosity of the hydrocarbon liquid stream.

A twenty-fifth aspect, which is the process of the twenty-fourth aspect, wherein the hydroprocessing unit comprises a hydrocracker, a hydrotreater, a hydrodealkylation unit, or combinations thereof.

A twenty-sixth aspect, which is the process of any one of the first through the twenty-fifth aspects, wherein the treated hydrocarbon liquid stream is characterized by an olefin content of less than about 1 wt. % olefins, based on the total weight of the treated hydrocarbon liquid stream.

A twenty-seventh aspect, which is the process of any one of the first through the twenty-sixth aspects, wherein the treated hydrocarbon liquid stream comprises one or more chloride compounds in an amount of less than about 10 ppmw chloride, based on the total weight of the treated hydrocarbon liquid stream.

A twenty-eighth aspect, which is the process of any one of the first through the twenty-seventh aspects, wherein at least a portion of the treated hydrocarbon liquid stream is fed to a steam cracker to produce a steam cracker product stream, wherein an amount of olefins in the steam cracker product stream is greater than an amount of olefins in the treated hydrocarbon liquid stream.

A twenty-ninth aspect, which is the process of any one of the first through the twenty-eighth aspects further comprising spraying at least a portion of the hydrocarbon liquid stream as droplets into a fluid catalytic cracker to produce a treated hydrocarbon liquid stream and a fluid catalytic cracker gas product stream, wherein the droplets are characterized by an average droplet size of less than about 500 microns.

A thirtieth aspect, which is the process of any one of the first through the twenty-ninth aspects, wherein (i) at least a portion of the hydrocarbon liquid stream is conveyed to a first hydroprocessing unit to produce a first treated hydrocarbon liquid stream and a first hydroprocessing unit gas product stream, wherein the first treated hydrocarbon liquid stream is characterized by an olefin content that is lower than an olefin content of the hydrocarbon liquid stream, and wherein the first treated hydrocarbon liquid stream is characterized by an aromatics content that is greater than or equal to an aromatics content of the hydrocarbon liquid stream; and wherein (ii) at least a portion of the first treated hydrocarbon liquid stream is conveyed to a second hydroprocessing unit to produce a second treated hydrocarbon liquid stream and a second hydroprocessing unit gas product stream, wherein the second treated hydrocarbon liquid stream is characterized by a boiling point that is lower than a boiling point of the hydrocarbon liquid stream and/or the first treated hydrocarbon liquid stream, and wherein the second treated hydrocarbon liquid stream is characterized by a viscosity that is lower than the viscosity of the hydrocarbon liquid stream and/or the first treated hydrocarbon liquid stream.

A thirty-first aspect, which is the process of the thirtieth aspect, wherein (iii) at least a portion of the first treated hydrocarbon liquid stream and/or the second treated hydrocarbon liquid stream is fed to a steam cracker to produce a steam cracker product stream, wherein an amount of olefins in the steam cracker product stream is greater than an amount of olefins in the first treated hydrocarbon liquid stream and/or the second treated hydrocarbon liquid stream, respectively.

A thirty-second aspect, which is the process of the thirty-first aspect, wherein at least a portion of the hydrocarbon gas stream, at least a portion of the steam cracker product stream, at least a portion of the first hydroprocessing unit gas product stream, at least a portion of the second hydroprocessing unit gas product stream, or combinations thereof are introduced to a separating unit to produce an olefin gas stream, a saturated hydrocarbons gas stream, an aromatics stream, and a heavies stream; wherein the olefin gas stream comprises ethylene, propylene, butene, butadiene, or combinations thereof; wherein the saturated hydrocarbons gas stream comprises methane, ethane, propanes, butanes, hydrogen, or combinations thereof; wherein the aromatics stream comprises $C_6$ to $C_8$ aromatic hydrocarbons; and wherein the heavies stream comprises $C_{5+}$ hydrocarbons other than $C_6$ to $C_8$ aromatic hydrocarbons.

A thirty-third aspect, which is the process of any one of the first through the thirty-second aspects, wherein the mixed plastics comprise polyvinylchloride and/or polyvinylidene chloride.

A thirty-fourth aspect, which is the process of any one of the first through the thirty-third aspects, wherein the mixed plastics comprise virgin mixed plastics and/or waste mixed plastics.

A thirty-fifth aspect, which is a process for processing mixed plastics comprising simultaneous pyrolysis and dechlorination of the mixed plastics, the process comprising (a) contacting the mixed plastics with a zeolitic catalyst in a pyrolysis unit at a pyrolysis temperature of from about 300° C. to about 500° C. to produce a hydrocarbon product, wherein the hydrocarbon product comprises a gas phase and a liquid phase; (b) separating the hydrocarbon product into a hydrocarbon gas stream and a hydrocarbon liquid stream, wherein the hydrocarbon gas stream comprises at least a portion of the gas phase of the hydrocarbon product, wherein the hydrocarbon liquid stream comprises at least a portion of the liquid phase of the hydrocarbon product, wherein the hydrocarbon liquid stream comprises one or more chloride compounds in an amount of less than about 100 ppmw chloride, based on the total weight of the hydrocarbon liquid stream, and wherein the hydrocarbon liquid stream is characterized by a viscosity of less than about 400 cP at a temperature of 300° C.; (c) conveying at least a portion of the hydrocarbon liquid stream to a first hydroprocessing unit to produce a first treated hydrocarbon liquid stream and a first hydroprocessing unit gas product stream, wherein the first treated hydrocarbon liquid stream is characterized by a boiling point that is lower than a boiling point of the hydrocarbon liquid stream, wherein the first treated hydrocarbon liquid stream is characterized by a viscosity that is lower than the viscosity of the hydrocarbon liquid stream, and wherein the first treated hydrocarbon liquid stream is characterized by a chloride content of less than 10 ppmw chloride, based on the total weight of the first treated hydrocarbon liquid stream; and (d) spraying at least a portion of the first hydrocarbon liquid stream as droplets into a fluid catalytic cracker operated in a hydropyrolysis mode to produce a second treated hydrocarbon liquid stream and a fluid catalytic cracker gas product stream, wherein the droplets are characterized by an average droplet size of less than about 300 microns, wherein the second treated hydrocarbon liquid stream comprises one or more chloride compounds in an amount of less than about 10 ppmw chloride, based on the total weight of the second treated hydrocarbon liquid stream, and wherein the second treated hydrocarbon liquid stream is characterized by an aromatics content of greater than about 20 wt. % aromatics, based on the total weight of the second treated hydrocarbon liquid stream.

A thirty-sixth aspect, which is the process of the thirty-fifth aspect, wherein at least a portion of the first treated hydrocarbon liquid stream is fed to a steam cracker to produce a steam cracker product stream, wherein an amount of olefins in the steam cracker product stream is greater than an amount of olefins in the first treated hydrocarbon liquid stream.

A thirty-seventh aspect, which is the process of any one of the thirty-fifth and the thirty-sixth aspects, wherein the second treated hydrocarbon liquid is characterized by an aromatics content of greater than about 70 wt. % aromatics, based on the total weight of the second treated hydrocarbon liquid stream.

A thirty-eighth aspect, which is a process for processing mixed plastics comprising simultaneous pyrolysis and dechlorination of the mixed plastics, the process comprising (a) contacting the mixed plastics with a zeolitic catalyst in a pyrolysis unit at a pyrolysis temperature of from about 300° C. to about 500° C. to produce a hydrocarbon product, wherein the hydrocarbon product comprises a gas phase and a liquid phase; (b) separating the hydrocarbon product into a hydrocarbon gas stream and a hydrocarbon liquid stream, wherein the hydrocarbon gas stream comprises at least a portion of the gas phase of the hydrocarbon product, wherein the hydrocarbon gas stream comprises hydrochloric acid (HCl), wherein the hydrocarbon liquid stream comprises at least a portion of the liquid phase of the hydrocarbon product, wherein the hydrocarbon liquid stream comprises one or more chloride compounds in an amount of less than about 100 ppmw chloride, based on the total weight of the hydrocarbon liquid stream, and wherein the hydrocarbon liquid stream is characterized by a viscosity of less than about 400 cP at a temperature of 300° C.; (c) conveying at least a portion of the hydrocarbon liquid stream to a first hydroprocessing unit to produce a first treated hydrocarbon liquid stream and a first hydroprocessing unit gas product stream, wherein the first treated hydrocarbon liquid stream is characterized by a boiling point that is lower than a boiling point of the hydrocarbon liquid stream, wherein the first treated hydrocarbon liquid stream is characterized by a viscosity that is lower than the viscosity of the hydrocarbon liquid stream, and wherein the first treated hydrocarbon liquid stream is characterized by a chloride content of less than 10 ppmw chloride, based on the total weight of the first treated hydrocarbon liquid stream; (d) spraying at least a portion of the first treated hydrocarbon liquid stream as droplets into a fluid catalytic cracker operated in a hydropyrolysis mode to produce a second treated hydrocarbon liquid stream and a fluid catalytic cracker gas product stream, wherein the droplets are characterized by an average droplet size of less than about 300 microns, wherein the second treated hydrocarbon liquid stream comprises one or more chloride compounds in an amount of less than about 10 ppmw chloride, based on the total weight of the second treated hydrocarbon liquid stream, and wherein the second treated hydrocarbon liquid stream is characterized by an aromatics content of greater than about 40 wt. % aromatics, based on the total weight of the second treated hydrocarbon liquid stream; (e) feeding at least a portion of the first treated hydrocarbon liquid stream to a steam cracker to produce a steam cracker product stream, wherein an amount of olefins in the steam cracker product stream is greater than an amount of olefins in the first treated hydrocarbon liquid stream; (f) introducing at least a portion of the hydrocarbon gas stream, at least a portion of the first hydroprocessing unit gas product stream, at least a portion of the fluid catalytic cracker gas product stream, or combinations thereof to a scrubber to produce a treated gas stream, wherein a chloride content of the treated gas stream is less than a chloride content of the hydrocarbon gas stream, the first hydroprocessing unit gas product stream, the fluid catalytic cracker gas product stream, or combinations thereof, respectively; and wherein at least a portion of the HCl in the hydrocarbon gas stream is removed in the scrubber; and (g) introducing at least a portion of the steam cracker product stream and at least a portion of the treated gas stream to a separating unit to produce an olefin gas stream, a saturated hydrocarbons gas stream, an aromatics stream, and a heavies stream; wherein the olefin gas stream comprises ethylene, propylene, butene, butadiene, or combinations thereof; wherein the saturated hydrocarbons gas stream comprises methane, ethane, propane, butanes, hydrogen, or combinations thereof; wherein the aromatics stream comprises $C_6$ to $C_8$ aromatic hydrocarbons; and wherein the heavies stream comprises $C_{5+}$ hydrocarbons other than $C_6$ to $C_8$ aromatic hydrocarbons.

A thirty-ninth aspect, which is the process of the thirty-eighth aspect, wherein the mixed plastics comprise equal to or greater than about 400 ppmw polyvinylchloride and/or polyvinylidene chloride, based on the total weight of the plastic waste.

A fortieth aspect, which is the process of any one of the thirty-eighth and the thirty-ninth aspects, wherein the mixed plastics comprise virgin mixed plastics and/or waste mixed plastics.

A forty-first aspect, which is a process for processing mixed plastics comprising simultaneous pyrolysis and dechlorination of the mixed plastics, the process comprising (a) contacting the mixed plastics with a zeolitic catalyst in a pyrolysis unit at a pyrolysis temperature of from about 300° C. to about 500° C. to produce a hydrocarbon product, wherein the hydrocarbon product comprises a gas phase and a liquid phase, and wherein the zeolitic catalyst comprises medium pore zeolites and/or large pore zeolites with a silicon to aluminum ratio of from about 10 to about 750; (b) separating the hydrocarbon product into a hydrocarbon gas stream and a hydrocarbon liquid stream, wherein the hydrocarbon gas stream comprises at least a portion of the gas phase of the hydrocarbon product, wherein the hydrocarbon gas stream comprises hydrochloric acid (HCl), wherein the hydrocarbon liquid stream comprises at least a portion of the liquid phase of the hydrocarbon product, wherein the hydrocarbon liquid stream comprises one or more chloride compounds in an amount of less than about 50 ppmw chloride, based on the total weight of the hydrocarbon liquid stream, and wherein the hydrocarbon liquid stream is characterized by a viscosity of less than about 400 cP at a temperature of 300° C.; (c) conveying at least a portion of the hydrocarbon liquid stream to a first hydroprocessing unit to produce a first treated hydrocarbon liquid stream and a first hydroprocessing unit gas product stream, wherein the first treated hydrocarbon liquid stream is characterized by a boiling point that is lower than a boiling point of the hydrocarbon liquid stream, wherein the first treated hydrocarbon liquid stream is characterized by a viscosity that is lower than the viscosity of the hydrocarbon liquid stream, and wherein the first treated hydrocarbon liquid stream is characterized by a chloride content of less than 5 ppmw chloride, based on the total weight of the first treated hydrocarbon liquid stream; (d) feeding at least a portion of the first treated hydrocarbon liquid stream into a second hydroprocessing unit to produce a second treated hydrocarbon liquid stream and a second hydroprocessing unit gas stream, wherein the second hydroprocessing unit can be a hydrocracker, a hydrotreater, or a hydrodealkylation unit, wherein the second treated hydrocarbon liquid stream comprises one or more chloride compounds in an amount of less than about 5 ppmw chloride, based on the total weight of the second treated hydrocarbon liquid stream, wherein the second treated hydrocarbon liquid stream is characterized by an olefin content of less than about 1 wt. %, based on the total weight of the second treated hydrocarbon liquid stream, wherein the second treated hydrocarbon liquid stream comprises aromatic hydrocarbons, and wherein equal to or greater than about 90 wt. % of the aromatic hydrocarbons of the second treated hydrocarbon liquid stream are monoaromatic hydrocarbons; (e) feeding at least a portion of the first treated hydrocarbon liquid stream to a steam cracker to produce a steam cracker product stream, wherein an amount of olefins in the steam cracker product stream is greater than an amount of olefins in the first treated hydrocarbon liquid stream; (f) introducing at least a portion of the hydrocarbon gas stream, at least a portion of the first hydroprocessing unit gas product stream, at least a portion of the second hydroprocessing unit gas stream, or combinations thereof to a scrubber to produce a treated gas stream, wherein a chloride content of the treated gas stream is less than a chloride content of the hydrocarbon gas stream, the first hydroprocessing unit gas product stream, the second hydroprocessing unit gas stream, or combinations thereof, respectively; and wherein at least a portion of the HCl in the hydrocarbon gas stream is removed in the scrubber; and (g) introducing at least a portion of the steam cracker product stream and at least a portion of the treated gas stream to a separating unit to produce an olefin gas stream, a saturated hydrocarbons gas stream, an aromatics stream, and a heavies stream; wherein the olefin gas stream comprises ethylene, propylene, butene, butadiene, or combinations thereof; wherein the saturated hydrocarbons gas stream comprises methane, ethane, propane, butanes, hydrogen, or combinations thereof; wherein the aromatics stream comprises $C_6$ to $C_8$ aromatic hydrocarbons; and wherein the heavies stream comprises $C_{5+}$ hydrocarbons other than $C_6$ to $C_8$ aromatic hydrocarbons.

While aspects of the disclosure have been shown and described, modifications thereof can be made without departing from the spirit and teachings of the invention. The aspects and examples described herein are exemplary only, and are not intended to be limiting. Many variations and modifications of the invention disclosed herein are possible and are within the scope of the invention.

Accordingly, the scope of protection is not limited by the description set out above but is only limited by the claims which follow, that scope including all equivalents of the subject matter of the claims. Each and every claim is incorporated into the specification as an aspect of the present invention. Thus, the claims are a further description and are an addition to the detailed description of the present invention. The disclosures of all patents, patent applications, and publications cited herein are hereby incorporated by reference.

What is claimed is:

1. A process for processing chlorinated mixed plastics comprising:

(a) contacting the chlorinated mixed plastics with a gas selected from the group consisting of hydrogen, $C_1$-$C_4$ hydrocarbons, and combinations thereof and a zeolitic catalyst in a pyrolysis unit at a temperature of 500° C. to produce a hydrocarbon product; and (b) separating the hydrocarbon product into a hydrocarbon gas stream comprising hydrogen chloride and $C_1$-$C_4$ hydrocarbons and a hydrocarbon liquid stream, comprising one or more chloride compounds in an amount of less than about 100 ppmw chloride based on a total weight of the hydrocarbon liquid stream, wherein the hydrocarbon liquid stream has a viscosity of less than about 400 cP at a temperature of 300° C.

2. The process of claim 1, wherein the gas includes the $C_1$ to $C_4$ hydrocarbons.

3. The process of claim 1, wherein the zeolitic catalyst comprises medium pore zeolites, large pore zeolites, or combinations thereof; and wherein the zeolitic catalyst is characterized by a pore size of from 4.5 Å to 7 Å.

4. The process of claim 1, wherein the zeolitic catalyst comprises calcium.

5. The process of claim 4, wherein the zeolitic catalyst further comprises a metal selected from the group consisting of titanium, nickel, copper, magnesium, tin, cobalt, iron, zinc, tungsten, vanadium, gallium, manganese, ruthenium and rhenium.

6. The process of claim 1, wherein the zeolitic catalyst comprises ZSM-5, ZSM 11, EU-1, EU-2, beta, mordenite, zeolite L, ferrierite, SBA-15, SAPO-5, SAPO-11, SAPO-31, SAPO-37, SAPO-41, or combinations thereof; and wherein the zeolitic catalyst further comprises calcium.

7. The process of claim 1, wherein the zeolitic catalyst consists of ferrierite.

8. The process of claim 1, wherein the zeolitic catalyst consists of zeolite L.

9. The process of claim 1, wherein the gas includes the hydrogen.

10. The process of claim 9, wherein the zeolitic catalyst consists of EU-1.

11. The process of claim 1, further comprising conveying at least a portion of the hydrocarbon liquid stream to a hydrodealkylation unit to produce a treated hydrocarbon liquid stream and a hydroprocessing unit gas product stream, wherein the treated hydrocarbon liquid stream has a boiling point that is lower than a boiling point of the hydrocarbon liquid stream, and wherein the treated hydrocarbon liquid stream has a viscosity that is lower than the viscosity of the hydrocarbon liquid stream.

12. The process of claim 1, wherein the zeolitic catalyst has a pore size of about 4.5 Å to 6.0 Å.

13. The process of claim 1, wherein the zeolitic catalyst contains calcium and has a pore size of 4.5 Å.

14. The process of claim 1, wherein the zeolitic catalyst further comprises calcium and a metal selected from the group consisting of titanium, nickel, copper, magnesium, tin, cobalt, iron, zinc, tungsten, vanadium, gallium, manganese, ruthenium and rhenium; and wherein the zeolitic catalyst comprises ZSM-5, ZSM-11, Y, high-silica Y, USY, EU-1, EU-2, beta, mordenite, L, ferrierite, SBA-15, SAPO-5, SAPO-11, SAPO-31, SAPO-37, or SAPO-41.

15. The process of claim 11, wherein the zeolitic catalyst consists of EU-2.

16. The process of claim 1, wherein the zeolitic catalyst is Mg loaded ZSM-5.

17. A process for processing chlorinated mixed plastics comprising:

(a) contacting the chlorinated mixed plastics with a zeolitic catalyst that comprises calcium in a pyrolysis unit at a temperature of 500° C. to produce a hydrocarbon product; and (b) separating the hydrocarbon product into a hydrocarbon gas stream comprising hydrogen chloride and $C_1$-$C_4$ hydrocarbons and a hydrocarbon liquid stream, comprising one or more chloride compounds in an amount of less than about 100 ppmw chloride based on a total weight of the hydrocarbon liquid stream, wherein the hydrocarbon liquid stream has a viscosity of less than about 400 cP at a temperature of 300° C.;

(c) conveying at least a portion of the hydrocarbon liquid stream to a first hydroprocessing unit to produce a first treated hydrocarbon liquid stream and a first hydroprocessing unit gas product stream, wherein the first treated hydrocarbon liquid stream has a boiling point that is lower than a boiling point of the hydrocarbon liquid stream, a viscosity that is lower than the viscosity of the hydrocarbon liquid stream, and a chloride content of less than 10 ppmw chloride based on a total weight of the first treated hydrocarbon liquid stream; and (d) spraying at least a portion of the first hydrocarbon liquid stream as droplets into a fluid catalytic cracker operated in a hydropyrolysis mode to produce a second treated hydrocarbon liquid stream and a fluid catalytic cracker gas product stream, wherein the droplets have an average droplet size of less than about 300 microns, wherein the second treated hydrocarbon liquid stream comprises one or more chloride compounds in an amount of less than about 10 ppmw chloride based on a total weight of the second treated hydrocarbon liquid stream, and wherein the second treated hydrocarbon liquid stream has an aromatics content of greater than about 20 wt.% aromatics based on the total weight of the second treated hydrocarbon liquid stream.

18. The process of claim 17, wherein at least a portion of the first treated hydrocarbon liquid stream is fed to a steam cracker to produce a steam cracker product stream;

wherein an amount of olefins in the steam cracker product stream is greater than an amount of olefins in the first treated hydrocarbon liquid stream; and wherein the second treated hydrocarbon liquid stream has an aromatics content of greater than about 70 wt.% aromatics based on the total weight of the second treated hydrocarbon liquid stream.

19. The process of claim 18, wherein at least a portion of the hydrocarbon gas stream, at least a portion of the steam cracker product stream, at least a portion of the first hydroprocessing unit gas product stream, at least a portion of the fluid catalytic cracker gas product stream, or combinations thereof are introduced to a separating unit to produce an olefin gas stream, a saturated hydrocarbons gas stream, an aromatics stream, and a heavies stream;

wherein the olefin gas stream comprises ethylene, propylene, butene, butadiene, or combinations thereof;

wherein the saturated hydrocarbons gas stream comprises methane, ethane, propane, butanes, or combinations thereof, and hydrogen;

wherein the aromatics stream comprises C6 to C8 aromatic hydrocarbons; and wherein the heavies stream comprises $C_{5+}$hydrocarbons other than $C_6$ to $C_8$ aromatic hydrocarbons.

20. A process for processing chlorinated mixed plastics, consisting of:

(a) contacting the chlorinated mixed plastics with a zeolitic catalyst containing calcium in a pyrolysis unit at a pyrolysis temperature of 500° C. to produce a hydrocarbon product;

(b) separating the hydrocarbon product into a hydrocarbon gas stream containing hydrogen chloride (HCl) and $C_1$-$C_4$ hydrocarbons and a hydrocarbon liquid stream containing a chloride compound in an amount of 100 ppmw chloride based on a total weight of the hydrocarbon liquid stream, wherein the hydrocarbon liquid stream has a viscosity of less than 400 cP at a temperature of 300° C;

(c) conveying at least a portion of the hydrocarbon liquid stream to a first hydroprocessing unit to produce a first treated hydrocarbon liquid stream and a first hydroprocessing unit gas product stream, wherein the first treated hydrocarbon liquid stream has a boiling point that is lower than a boiling point of the hydrocarbon liquid stream, a viscosity that is lower than the viscosity of the hydrocarbon liquid stream, and a chloride content of less than 10 ppmw chloride based on a total weight of the first treated hydrocarbon liquid stream;

(d) spraying at least a portion of the first treated hydrocarbon liquid stream as droplets into a fluid catalytic cracker operated in a hydropyrolysis mode to produce a second treated hydrocarbon liquid stream and a fluid catalytic cracker gas product stream, wherein the droplets have an average droplet size of less than about 300 microns, wherein the second treated hydrocarbon liquid stream comprises one or more chloride compounds in an amount of less than 10 ppmw chloride based on a total weight of the second treated hydrocarbon liquid stream, and wherein the second treated hydrocarbon liquid stream has an aromatics content of greater than about 40 wt.% aromatics based on the total weight of the second treated hydrocarbon liquid stream;

(e) feeding at least a portion of the first treated hydrocarbon liquid stream to a steam cracker to produce a steam cracker product stream, wherein an amount of olefins in the steam cracker product stream is greater than an amount of olefins in the first treated hydrocarbon liquid stream;

(f) introducing at least a portion of the hydrocarbon gas stream, at least a portion of the first hydroprocessing unit gas product stream, at least a portion of the fluid catalytic cracker gas product stream, or combinations thereof to a scrubber to produce a treated gas stream, wherein a chloride content of the treated gas stream is less than a chloride content of the hydrocarbon gas stream, the first hydroprocessing unit gas product stream, the fluid catalytic cracker gas product stream, or combinations thereof, respectively; and wherein at least a portion of the HCl in the hydrocarbon gas stream is removed in the scrubber; and (g) introducing at least a portion of the steam cracker product stream and at least a portion of the treated gas stream to a separating unit to produce an olefin gas stream, a saturated hydrocarbons gas stream, an aromatics stream, and a heavies stream;

wherein the olefin gas stream comprises ethylene, propylene, butene, butadiene, or combinations thereof;

wherein the saturated hydrocarbons gas stream comprises methane, ethane, propane, butanes, hydrogen, or combinations thereof;

wherein the aromatics stream comprises C6 to C8 aromatic hydrocarbons; and wherein the heaves stream comprises C5+ hydrocarbons other than C6 to C8 aromatic hydrocarbons.

* * * * *